(12) United States Patent
Yonemura et al.

(10) Patent No.: US 12,335,272 B2
(45) Date of Patent: Jun. 17, 2025

(54) APPARATUS FOR VERIFYING RECORD, METHOD AND NON-TRANSITORY COMPUTER READABLE MEDIUM

(71) Applicant: KABUSHIKI KAISHA TOSHIBA, Tokyo (JP)

(72) Inventors: Tomoko Yonemura, Kawasaki Kanagawa (JP); Tsukasa Omino, Tokyo (JP); Misaki Komatsu, Yokohama Kanagawa (JP); Yoshikazu Hanatani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 19 days.

(21) Appl. No.: 17/903,475

(22) Filed: Sep. 6, 2022

(65) Prior Publication Data
US 2023/0177207 A1   Jun. 8, 2023

(30) Foreign Application Priority Data

Dec. 8, 2021   (JP) ................. 2021-199582

(51) Int. Cl.
*H04L 9/40*    (2022.01)
*G06F 11/34*   (2006.01)
*G06F 21/62*   (2013.01)

(52) U.S. Cl.
CPC .......... *H04L 63/12* (2013.01); *G06F 11/3476* (2013.01); *G06F 21/6245* (2013.01)

(58) Field of Classification Search
CPC ..... H04L 63/12; H04L 63/123; G06F 11/3476
See application file for complete search history.

(56) References Cited

U.S. PATENT DOCUMENTS

| 10,154,052 B1* | 12/2018 | McClintock | .......... H04L 67/141 |
|---|---|---|---|
| 2008/0082650 A1 | 4/2008 | Takata et al. | |
| 2020/0120080 A1* | 4/2020 | Isozaki | ................. H04L 63/062 |
| 2020/0153637 A1 | 5/2020 | Sakai et al. | |
| 2021/0089517 A1 | 3/2021 | Suga | |
| 2022/0141197 A1 | 5/2022 | Yonemura et al. | |

(Continued)

FOREIGN PATENT DOCUMENTS

| JP | 2004-206564 A | 7/2004 |
|---|---|---|
| JP | 2007-213373 A | 8/2007 |

(Continued)

OTHER PUBLICATIONS

Japan Patent Office, Office Action in JP App. No. 2021-199582, 3 pages, and machine translation, 5 pages (Nov. 12, 2024).

(Continued)

*Primary Examiner* — Boris D Grijalva Lobos
(74) *Attorney, Agent, or Firm* — Finnegan, Henderson, Farabow, Garrett & Dunner, LLP

(57) ABSTRACT

According to one embodiment, an information processing apparatus includes a processor configured to: acquire a record that is at least one of a record related to a process for data and a record related to consent to the process for the data, from a first storage system that stores the record; acquire a log of an operation performed in relation to at least one of the process and the consent, from a second storage system that stores the log; and verify consistency of the acquired record, based on the acquired log.

20 Claims, 31 Drawing Sheets

(56) References Cited

U.S. PATENT DOCUMENTS

| | | |
|---|---|---|
| 2022/0147651 A1 | 5/2022 | Omino et al. |
| 2022/0147655 A1 | 5/2022 | Komatsu et al. |
| 2023/0118762 A1 | 4/2023 | Omino et al. |

FOREIGN PATENT DOCUMENTS

| | | |
|---|---|---|
| JP | 2008-84246 A | 4/2008 |
| JP | 2010-97583 A | 4/2010 |
| JP | 2011-22825 A | 2/2011 |
| JP | 2020-77347 A | 5/2020 |
| JP | 2020-98972 A | 6/2020 |
| JP | 2021-48546 A | 3/2021 |
| JP | 2022-74414 A | 5/2022 |
| JP | 2022-75328 A | 5/2022 |
| JP | 2022-75337 A | 5/2022 |
| JP | 2023-59719 A | 4/2023 |
| WO | WO 2021/124568 A1 | 6/2021 |

OTHER PUBLICATIONS

Hisashi Naito et al., "Proposal of Affected Range Estimation Method Based on Attack Scenarios," Inf. Proc. Soc. of Japan, Report of Research on Computer Security (CSEC), vol. 2020-CSEC-88, No. 39, 7 pages (2020).

\* cited by examiner

ATTRIBUTE INFORMATION 1

| OWNER IDENTIFIER | U000001 |
|---|---|
| TYPE | T0001 |
| DETAILS 1 | D0001 |
| DETAILS 2 | 2020/08 |
| DETAILS 3 | 00001 |

PERSONAL DATA 1

| DATE AND TIME | BODY TEMPERATURE |
|---|---|
| 2020/08/01, 06:00 | 36.6 |
| 2020/08/02, 06:20 | 36.5 |
| 2020/08/03, 06:10 | 36.7 |
| ... | ... |

FIG. 2

TYPE AND DETAILS

| DATA TYPE IDENTIFIER | DESCRIPTION | DATA DETAIL IDENTIFIER | DESCRIPTION |
|---|---|---|---|
| T0001 | HEALTHCARE DATA | D0001 | BODY TEMPERATURE |
|  |  | D0002 | BODY WEIGHT |
|  |  | D0003 | THE NUMBER OF STEPS |
| T0002 | "a" DATA | D0004 | "a1" DATA |
|  |  | D0005 | "a2" DATA |

FIG. 3A

BUSINESS OPERATOR

| BUSINESS OPERATOR IDENTIFIER | DESCRIPTION |
|---|---|
| C001 | NAME, REPRESENTATIVE AND ADDRESS OF "c" COMPANY |
| C002 | NAME, REPRESENTATIVE AND ADDRESS OF "d" COMPANY |

FIG. 3B

PURPOSE

| PURPOSE IDENTIFIER | DESCRIPTION |
|---|---|
| P001 | "e" FOR BUSINESS |
| P002 | "f" FOR RESEARCH |

FIG. 3C

HANDLING AT WITHDRAWAL

| WITHDRAWAL IDENTIFIER | DESCRIPTION |
|---|---|
| N001 | STOP USE; DELETE NO DATA |
| N002 | DELETE DATA |

FIG. 3D

CONSENT INFORMATION 7

| CONSENT INFORMATION IDENTIFIER | C000007 |
|---|---|
| OWNER IDENTIFIER | U000001 |
| TYPE | T0002 |
| DETAILS 1 | UNCONSTRAINED |
| DETAILS 2 | 2020/08 |
| PROVIDER BUSINESS OPERATOR | C002 |
| RECEIVER BUSINESS OPERATOR | C001 |
| CONSENT STATE TO DATA RECEPTION BY RECEIVER BUSINESS OPERATOR | CONSENT |
| CONSENT STATE TO DATA RETENTION BY RECEIVER BUSINESS OPERATOR | CONSENT |
| PURPOSE 1 OF RECEIVER BUSINESS OPERATOR | P001 |
| CONSENT STATE TO PURPOSE 1 | CONSENT |
| PURPOSE 2 OF BUSINESS OPERATOR | P002 |
| CONSENT STATE TO PURPOSE 2 | CONSENT |
| CONSENT STATE TO HOLDING OF CONSENT INFORMATION AND RECORD | CONSENT |
| CONSENT TIME PERIOD | UNCONSTRAINED |
| HANDLING AT WITHDRAWAL | N001 |
| CONSENT DATE AND TIME | 2020/09/01 |

REQUEST INFORMATION 1

| REQUEST TYPE | DISCLOSURE |
|---|---|
| OWNER IDENTIFIER | U000001 |
| TYPE | T0002 |
| DETAILS 1 | D0004 |
| DETAILS 2 | 2020/08 |
| PROVIDER BUSINESS OPERATOR | C002 |
| RECEIVER BUSINESS OPERATOR | C001 |
| PURPOSE1 | P001 |
| PURPOSE2 | P002 |

ATTRIBUTE INFORMATION 2

| OWNER IDENTIFIER | U000001 |
|---|---|
| TYPE | T0002 |
| DETAILS 1 | D0004 |
| DETAILS 2 | 2020/08 |

FIG. 4

ATTRIBUTE INFORMATION 1

| OWNER IDENTIFIER | U000002 |
|---|---|
| TYPE | T0001 |
| DETAILS 1 | D0001 |
| DETAILS 2 | 2020/08 |
| DETAILS 3 | 00001 |

REQUEST INFORMATION 2

| REQUEST TYPE | DISCLOSURE |
|---|---|
| OWNER IDENTIFIER | U000002 |
| TYPE | T0001 |
| DETAILS 1 | D0001 |
| DETAILS 2 | 2020/08 |
| DETAILS 3 | 00001 |
| ACQUIRER BUSINESS OPERATOR | C001 |
| PURPOSE 1 OF ACQUIRER BUSINESS OPERATOR | P001 |
| PURPOSE 2 OF ACQUIRER BUSINESS OPERATOR | P002 |

CONSENT INFORMATION 3

| CONSENT INFORMATION IDENTIFIER | C000003 |
|---|---|
| OWNER IDENTIFIER | U000002 |
| TYPE | T0001 |
| DETAILS 1 | D0001 |
| DETAILS 2 | 2020/08 |
| DETAILS 3 | 00001 |
| ACQUIRER BUSINESS OPERATOR | C001 |
| CONSENT STATE TO DATA RETENTION BY ACQUIRER BUSINESS OPERATOR | CONSENT |
| CONSENT STATE TO DATA RETENTION BY ACQUIRER BUSINESS OPERATOR | CONSENT |
| PURPOSE 1 OF ACQUIRER BUSINESS OPERATOR | P001 |
| CONSENT STATE TO PURPOSE 1 | CONSENT |
| PURPOSE 2 OF ACQUIRER BUSINESS OPERATOR | P002 |
| CONSENT STATE TO PURPOSE 2 | CONSENT |
| CONSENT STATE TO HOLDING OF CONSENT INFORMATION AND RECORD | CONSENT |
| CONSENT TIME PERIOD | UNCONSTRAINED |
| HANDLING AT WITHDRAWAL | N002 |
| CONSENT DATE AND TIME | 2020/09/01 |

FIG. 5

| ATTRIBUTE INFORMATION 2 | |
|---|---|
| OWNER IDENTIFIER | U000001 |
| TYPE | T0002 |
| DETAILS 1 | D0004 |
| DETAILS 2 | 2020/08 |

| REQUEST INFORMATION 3 | |
|---|---|
| REQUEST TYPE | USE |
| OWNER IDENTIFIER | U000001 |
| TYPE | T0002 |
| DETAILS 1 | D0004 |
| DETAILS 2 | 2020/08 |
| USE BUSINESS OPERATOR | C001 |
| PURPOSE 1 OF USE BUSINESS OPERATOR | P001 |
| PURPOSE 2 OF USE BUSINESS OPERATOR | P002 |

| CONSENT INFORMATION 7 | |
|---|---|
| CONSENT INFORMATION IDENTIFIER | C000007 |
| OWNER IDENTIFIER | U000001 |
| TYPE | T0002 |
| DETAILS 1 | UNCONSTRAINED |
| DETAILS 2 | 2020/08 |
| PROVIDER BUSINESS OPERATOR | C002 |
| RECEIVER BUSINESS OPERATOR | C001 |
| CONSENT STATE TO DATA RECEPTION BY RECEIVER BUSINESS OPERATOR | CONSENT |
| CONSENT STATE TO DATA RETENTION BY RECEIVER BUSINESS OPERATOR | CONSENT |
| PURPOSE 1 OF RECEIVER BUSINESS OPERATOR | P001 |
| CONSENT STATE TO PURPOSE 1 | CONSENT |
| PURPOSE 2 OF RECEIVER BUSINESS OPERATOR | P002 |
| CONSENT STATE TO PURPOSE 2 | CONSENT |
| CONSENT STATE TO HOLDING OF CONSENT INFORMATION AND RECORD | CONSENT |
| CONSENT TIME PERIOD | UNCONSTRAINED |
| HANDLING AT WITHDRAWAL | N001 |
| CONSENT DATE AND TIME | 2020/09/01 |

FIG. 6

DISCLOSURE RECORD

| RECORD IDENTIFIER | R000001 |
|---|---|
| RECORD TYPE | DISCLOSURE |
| RECORD BUSINESS OPERATOR (PROVIDER BUSINESS OPERATOR) | C002 |
| RECEIVER BUSINESS OPERATOR | NAME OF "c" COMPANY |
| CONSENT INFORMATION | C000007 |
| OWNER IDENTIFIER | U000001 |
| TYPE | T0002 |
| DETAILS1 | D0004 |
| DETAILS2 | 2020/08 |
| DATE AND TIME | 2020/09/01 |

RECEIPT RECORD

| RECORD IDENTIFIER | R000002 |
|---|---|
| RECORD TYPE | RECEPTION |
| RECORD BUSINESS OPERATOR (RECEIVER BUSINESS OPERATOR) | C001 |
| PROVIDER BUSINESS OPERATOR | NAME, REPRESENTATIVE AND ADDRESS OF "d" COMPANY |
| CONSENT INFORMATION | C000007 |
| WAY OF ACQUIREMENT | DOCUMENT |
| OWNER IDENTIFIER | U000001 |
| TYPE | T0002 |
| DETAILS2 | D0004 |
| DETAILS2 | 2020/08 |
| DATE AND TIME | 2020/09/01 |

FIG. 7

ATTRIBUTE INFORMATION 3

| OWNER IDENTIFIER | U00001 |
|---|---|
| TYPE | T0003 |
| DETAILS 1 | D0006 |
| DETAILS 2 | 2020/08 |

RECORD OF DATA GENERATION

| RECORD IDENTIFIER | R000004 |
|---|---|
| RECORD TYPE | GENERATION |
| RECORD BUSINESS OPERATOR (ANALYSIS BUSINESS OPERATOR) | C001 |
| CONSENT INFORMATION | C000007 |
| USED DATA OWNER IDENTIFIER | U000001 |
| USE DATA TYPE | T0002 |
| USE DATA DETAIL 1 | D0004 |
| USE DATA DETAIL 2 | 2020/08 |
| GENERATED DATA OWNER IDENTIFIER | U000001 |
| GENERATED DATA TYPE | T0003 |
| GENERATED DATA DETAIL 1 | D0006 |
| GENERATED DATA DETAIL 2 | 2020/08 |
| DATE AND TIME | 2020/09/05 |

FIG. 8

ACQUIREMENT RECORD

| RECORD IDENTIFIER | R000003 |
|---|---|
| RECORD TYPE | ACQUIREMENT |
| RECORD BUSINESS OPERATOR (ACQUIRER BUSINESS OPERATOR) | C001 |
| CONSENT INFORMATION | C000008 |
| OWNER IDENTIFIER | U000002 |
| TYPE | T0001 |
| DETAILS1 | D0001 |
| DETAILS2 | 2020/08 |
| DATE AND TIME | 2020/09/01 |

FIG. 9

DATA ACCESS LOG 1

| # | TYPE | RECORD BUSINESS OPERATOR | ACCESS DESTINATION | DATE AND TIME |
|---|---|---|---|---|
| 1 | WRITE | C001 | U000001,T0002,D0004,2020/08 | 2020/09/01 |
| 2 | WRITE | C001 | U000002,T0001,D0001,2020/08 | 2020/09/01 |
| 3 | READ | C001 | U000001,T0002,D0004,2020/08 | 2020/09/05 |
| 4 | WRITE | C001 | U000001,T0003,D0006,2020/08 | 2020/09/05 |
| 5 | DELETE | C001 | U000002,T0001,D0001,2020/08 | 2020/10/01 |

FIG. 11

RECORD OF DELETION

| RECORD IDENTIFIER | R000005 |
|---|---|
| RECORD TYPE | DELETE |
| RECORD BUSINESS OPERATOR (DELETION BUSINESS OPERATOR) | C001 |
| CONSENT INFORMATION | C000010 |
| OWNER IDENTIFIER | U000002 |
| TYPE | T0001 |
| DETAILS 1 | D0001 |
| DETAILS 2 | 2020/08 |
| DATE AND TIME | 2020/10/01 |

FIG. 12

TRANSMISSION LOG 1 – 2A

| # | TRANSMISSION PARTY | RECEPTION PARTY | CONTENT | DATE AND TIME |
|---|---|---|---|---|
| 1 | U000002 | C001 | U000002,T0001,D0001,2020/08, ... CONSENT... | 2020/09/01 |
| 2 | U000001 | C001 | U000001,T0002, UNCONSTRAINED,2020/08, ... CONSENT ... | 2020/09/01 |
| 3 | C002 | C001 | U000001,T0002,D0004,2020/08 | 2020/09/01 |
| 4 | U000002 | C001 | U000002,T0001,D0001,2020/08 | 2020/09/01 |
| 5 | U000002 | C001 | U000002,T0001,D0001,2020/08, ...NONCONSENT... | 2020/10/01 |

FIG. 13

TRANSMISSION 1 – 2B

| # | TRANSMISSION PARTY | RECEPTION PARTY | TYPE | DATE AND TIME |
|---|---|---|---|---|
| 1 | U000002 | C001 | RECEIVE CONSENT FROM OWNER | 2020/09/01 |
| 2 | U000001 | C001 | RECEIVE CONSENT FROM OWNER | 2020/09/01 |
| 3 | C002 | C001 | RECEIVE PERSONAL DATA | 2020/09/01 |
| 4 | U000002 | C001 | RECEIVE PERSONAL DATA | 2020/09/01 |
| 5 | U000002 | C001 | RECEIVE CONSENT FROM OWNER | 2020/10/01 |

FIG. 14

CONSENT INFORMATION 10 (CONSENT WITHDRAWAL INFORMATION)

| | |
|---|---|
| CONSENT INFORMATION IDENTIFIER | C000010 |
| OWNER IDENTIFIER | U000002 |
| TYPE | T0001 |
| DETAILS1 | D0001 |
| DETAILS2 | 2020/08 |
| DETAILS3 | 00001 |
| ACQUIRER BUSINESS OPERATOR | C001 |
| CONSENT STATE TO DATA ACQUIREMENT BY ACQUIRER BUSINESS OPERATOR | NONCONSENT |
| CONSENT STATE TO DATA RETENTION BY ACQUIRER BUSINESS OPERATOR | |
| PURPOSE 1 OF ACQUIRER BUSINESS OPERATOR | P001 |
| CONSENT STATE TO PURPOSE 1 | |
| PURPOSE 2 OF ACQUIRER BUSINESS OPERATOR | P002 |
| CONSENT STATE TO PURPOSE 2 | |
| CONSENT STATE TO HOLDING OF CONSENT INFORMATION AND RECORD | CONSENT |
| CONSENT TIME PERIOD | UNCONSTRAINED |
| HANDLING AT WITHDRAWAL | N002 |
| CONSENT DATE AND TIME | 2020/10/01 |

FIG. 16

AUTHENTICATION LOG 1 – 4

| # | OWNER | CONTENT | DATE AND TIME |
|---|---|---|---|
| 1 | U000002 | SUCCESS IN AUTHENTICATION | 2020/09/01 |
| 2 | U000001 | SUCCESS IN AUTHENTICATION | 2020/09/01 |
| 3 | U000002 | SUCCESS IN AUTHENTICATION | 2020/10/01 |

| FIRST STORAGE SYSTEM | DATA MANAGEMENT APPARATUS | DATA TRANSMITTER APPARATUS | DATA RECEIVER APPARATUS |
|---|---|---|---|
| OWNER IDENTIFIER1 | OWNER IDENTIFIER2 | OWNER IDENTIFIER3 | OWNER IDENTIFIER4 |
| U000001 | V000001 | @username1 | First1.Last1@mail.com |
| U000002 | V000002 | @username2 | First2.Last2@mail.com |
| U000003 | V000003 | @username3 | First3.Last3@mail.com |
| ... | ... | ... | ... |

| FIRST STORAGE SYSTEM | DATA MANAGEMENT APPARATUS | DATA TRANSMITTER APPARATUS | DATA RECEIVER APPARATUS |
|---|---|---|---|
| OWNER IDENTIFIER1 | OWNER IDENTIFIER2 | OWNER IDENTIFIER3 | OWNER IDENTIFIER4 |
| U000001 | DKGLANCK | Username1 | First1.Last1@mail.com |
| U000002 | PEQZLFMA | Username2 | First2.Last2@mail.com |
| U000003 | PWODLFJO | Username3 | First3.Last3@mail.com |
| ... | ... | ... | ... |

FIG. 20

DATA ACCESS LOG 2 – 1

| # | TYPE | RECORD BUSINESS OPERATOR | ACCESS DESTINATION | DATE AND TIME |
|---|---|---|---|---|
| 1 | WRITE | C001 | DKGLANCK,T0002,D0004,2020/08 | 2020/09/01 |
| 2 | WRITE | C001 | PEQZLFMA,T0001,D0001,2020/08 | 2020/09/01 |
| 3 | READ | C001 | DKGLANCK,T0002,D0004,2020/08 | 2020/09/05 |
| 4 | WRITE | C001 | DKGLANCK,T0003,D0006,2020/08 | 2020/09/05 |
| 5 | DELETE | C001 | PEQZLFMA,T0001,D0001,2020/08 | 2020/10/01 |

FIG. 22

COMMUNICATION LOG 2 – 2

| # | TRANSMISSION PARTY | RECEPTION PARTY | CONTENT | DATE AND TIME |
|---|---|---|---|---|
| 1 | V000002 | C001 | V000002,T0001,D0001,2020/08, … CONSENT … | 2020/09/01 |
| 2 | V000001 | C001 | V000001,T0002,UNCONSTRAINED,2020/08, … CONSENT … | 2020/09/01 |
| 3 | C002 | C001 | Username1,T0002,D0004,2020/08 | 2020/09/01 |
| 4 | V000002 | C001 | V000002,T0001,D0001,2020/08 | 2020/09/01 |
| 5 | V000002 | C001 | V000002,T0001,D0001,2020/08, …NONCONSENT … | 2020/10/01 |

FIG. 23

DATA ACCESS LOG 3 – 1

| # | TYPE | RECORD BUSINESS OPERATOR | ACCESS DESTINATION | DATE AND TIME |
|---|------|--------------------------|--------------------|---------------|
| 1 | WRITE | dealer1 | hanako | 2021/08/13 |
| 2 | READ | dealer1 | hanako | 2021/08/14 |
| 3 | READ | dealer1 | hanako | 2021/08/14 |
| 4 | READ | dealer1 | hanako | 2021/08/15 |
| 5 | DELETE | dealer1 | hanako | 2020/08/20 |

FIG. 28

COMMUNICATION LOG 3 – 2

| # | TRANSMISSION PARTY | RECEPTION PARTY | CONTENT | DATE AND TIME |
|---|---|---|---|---|
| 1 | hanako | delaer1 | ACQUIREMENT, dealer1, CONSENT | 2021/08/11 |
| 2 | hanako | dealer1 | DISCLOSURE, dealer1, company1, CONSENT | 2021/08/12 |
| 3 | hanako | dealer1 | DISCLOSURE, dealer1, company2, CONSENT | 2021/08/12 |
| 4 | hanako | dealer1 | hanako | 2021/08/13 |
| 5 | dealer1 | company1 | g7h8i9 | 2021/08/14 |
| 6 | dealer1 | company2 | J1k2m3 | 2021/08/14 |
| 7 | hanako | dealer1 | ACQUIREMENT, dealer1, NONCONSENT | 2021/08/20 |

FIG. 29

AUTHENTICATION LOG 3 – 4

| # | RELATED PARTY | CONTENT | DATE AND TIME |
|---|---|---|---|
| 1 | hanako | SUCCESS IN AUTHENTICATION | 2021/08/11 |
| 2 | hanako | SUCCESS IN AUTHENTICATION | 2021/08/12 |
| 3 | hanako | SUCCESS IN AUTHENTICATION | 2021/08/13 |
| 4 | hanako | SUCCESS IN AUTHENTICATION | 2021/08/20 |

FIG. 30

APPARATUS FOR VERIFYING RECORD, METHOD AND NON-TRANSITORY COMPUTER READABLE MEDIUM

CROSS REFERENCE TO RELATED APPLICATIONS

This application is based upon and claims the benefit of priority from the prior Japanese Patent Application No. 2021-199582, filed on Dec. 8, 2020, the entire contents of which are incorporated herein by reference.

FIELD

Embodiments described herein relate to an information processing apparatus, an information processing method, and a non-transitory computer readable medium.

BACKGROUND

According to Act on the Protection of Personal Information (hereinafter called Personal Information Protection Act), a personal information handling business operator is required to preliminarily specify the use purpose of personal information (including special care-required personal information) before acquiring and using the personal information, and preliminarily obtain consent of a principal, i.e., an owner of personal data, before disclosure of the personal data to a third party and before receipt of the personal data from a third party. For example, the personal information handling business operator creates a record related to the consent, and verifies existence or non-existence of the consent before executing a process that requires the consent of the owner.

To allow the flow of providing the personal data to be traceable, the personal information handling business operator is required to create a record related to the disclosure and store the record for a certain time period when providing the personal data for a third party. For example, the personal information handling business operator records a fact of providing personal data together with the name of the owner, consent by the owner, items of the personal data, name of a third party that is a disclosure destination and the like. The personal information handling business operator that is the third party provided with the personal data is required to verify the way of acquiring the provided personal data by the personal information handling business operator as the disclosure source, create a record related to receipt, and store the record for a certain time period. For example, the third party provided with the personal data, in other words, the user of the personal data verifies the name of the personal information handling business operator that is the disclosure source, and the way of acquiring the provided personal data by the personal information handling business operator as the disclosure source, and records the fact of receiving the personal data together with the verified information.

To allow the process performed for the personal data to be verified, the personal information handling business operator creates and store, for a certain time period, not only the record related to disclosure (disclosure record) and the record related to receipt (receipt record), but also, for example, a record related to acquiring the personal data (acquirement record), a record related to generation (e.g., data generated by processing the personal data) (generation record), and a record related to deletion (deletion record). These records are collectively called records related to processes. A mechanism of verifying, by the owner or an auditor, whether the process for the personal data by the personal information handling business operator is actually performed as indicated by the record, that is, whether execution of the process by the personal information handling business operator is reflected in the record related to the process, is required. However, such a mechanism does not currently exist.

BRIEF DESCRIPTION OF THE DRAWINGS

FIG. 2 shows an example of personal data and its attribute information;

FIGS. 3A, 3B, 3C and 3D each show examples of data type and details, examples of operator identifiers, examples of identifiers of purposes of data processing (purpose identifiers), and examples of withdrawal identifiers for handling at withdrawal of consent information;

FIG. 4 shows examples of attribute information on personal data, request information, and consent information;

FIG. 5 shows other examples of attribute information on personal data, request information, and consent information;

FIG. 6 shows still other examples of attribute information on personal data, request information, and consent information;

FIG. 7 shows an example of a disclosure record, and an example of receipt record;

FIG. 8 shows an example of attribute information on analysis result data (generated data), and an example of an analysis record;

FIG. 9 shows an example of a record of acquirement;

FIG. 11 shows an example of a data access log;

FIG. 12 shows an example of a record of deletion;

FIG. 13 shows an example of a communication log according to the first embodiment;

FIG. 14 shows another example of a communication log according to the first embodiment;

FIG. 16 shows an example of consent information (consent withdrawal information);

FIG. 17 shows an example of an authentication log according to the first embodiment;

FIG. 19 shows an example of a correspondence table according to the second embodiment;

FIG. 20 shows an example of an association table where owner identifiers 2 are pseudonyms;

FIG. 22 shows another example of a data access log according to the second embodiment;

FIG. 23 shows an example of a communication log according to the second embodiment;

FIG. 28 shows an example of a data access log according to the third embodiment;

FIG. 29 shows an example of a communication log according to the third embodiment;

FIG. 30 shows an example of an authentication log according to the third embodiment.

DETAILED DESCRIPTION

Figure 1:
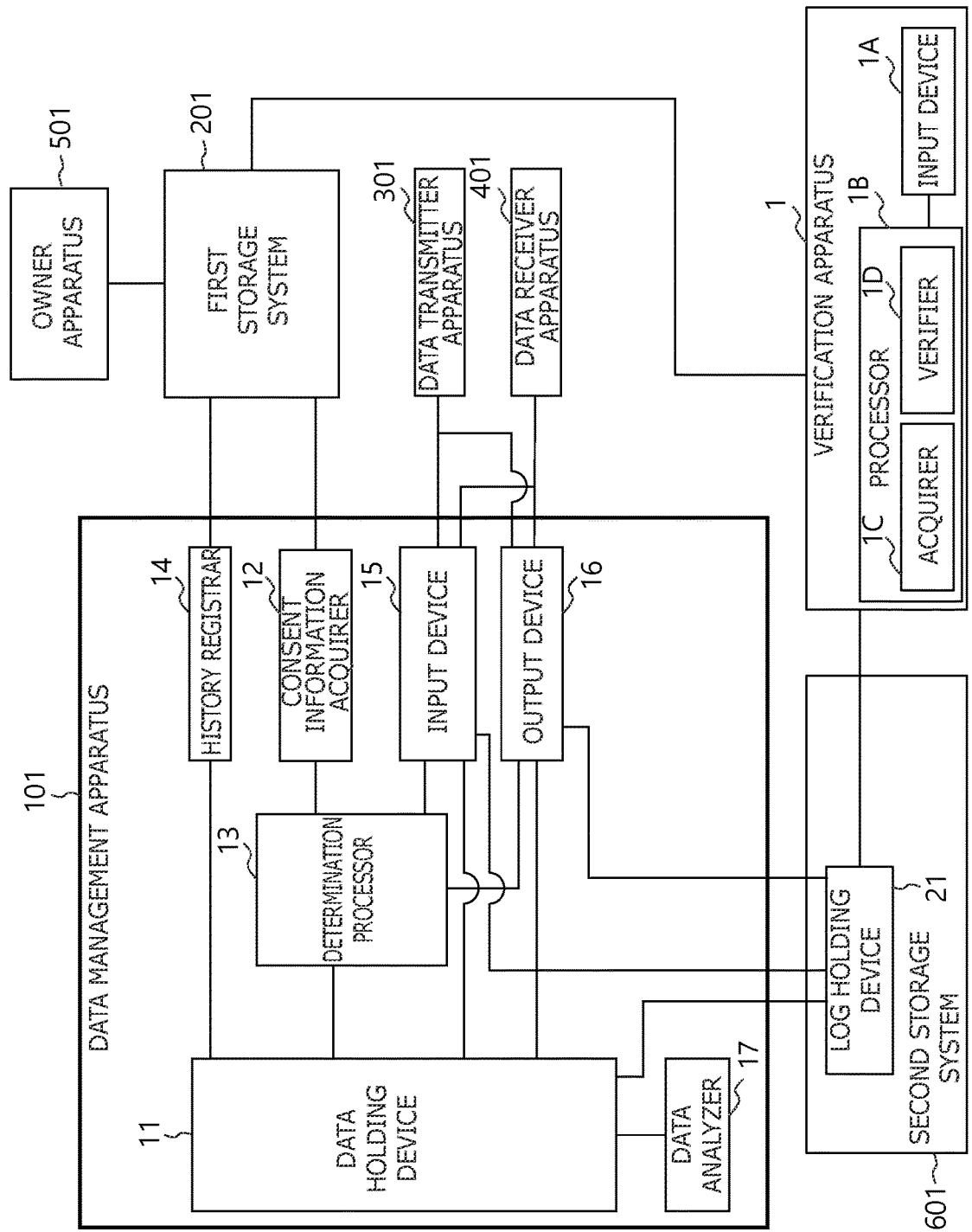
FIG. 1 is an overall configuration diagram of a data management system according to a first embodiment.

According to one embodiment, an information processing apparatus includes a processor which acquires a record that is at least one of a record related to a process for data and a record related to consent to the process for the data, from a first storage system that stores the record; and acquires a log of an operation performed in relation to at least one of the process and the consent, from a second storage system that stores the log; and verify consistency of the acquired record, based on the acquired log.

Hereinafter, referring to the drawings, embodiments of the present invention are described. In the drawings, the same elements are assigned the same signs, and description is appropriately omitted except changed or extended processes.

First Embodiment

Embodiment 1-1

FIG. 1 is an overall configuration diagram of a data management system that is an information processing system according to a first embodiment. The data management system in FIG. 1 includes a verification apparatus 1 that is an information processing apparatus according to this embodiment, a data management apparatus 101, a consent information and history information storage system 201 (hereinafter, described as a first storage system 201), a data transmitter apparatus 301, a data receiver apparatus 401, an owner apparatus 501, and a second storage system 601.

The verification apparatus 1 is connected to the first storage system 201 and the second storage system 601 via a communication network. The data management apparatus 101 is connected to the first storage system 201, the data transmitter apparatus 301, the data receiver apparatus 401, and the second storage system 601 via a communication network. The data management apparatus 101 may be connected to the owner apparatus 501 via the 10 communication network. The owner apparatus 501 is connected to the first storage system 201 via the communication network. The data transmitter apparatus 301 and the data receiver apparatus 401 may be connected to the first storage system 201 via the communication network. Each communication network may be a wide area network such as the Internet or a mobile network, a local area network such as an Ethernet or a wireless LAN (Local Area Network), or a cable such as a serial communication cable. For example, the data management apparatus 101 may be a computer that includes, a processor, such as a CPU (Central Processing Unit), and a memory.

The data management apparatus 101 receives request information for a request to perform a process on data for a certain person; the request is issued by an apparatus or a system of a business operator that manages the data management apparatus 101, the data transmitter apparatus 301, the data receiver apparatus 401, and the owner apparatus 501. Transmission of the request information issued from the data transmitter apparatus 301 or the data receiver apparatus 401 to the data management apparatus 101 may be performed by the apparatus or the system of the business operator that manages the data management apparatus 101 or the owner apparatus 501 requesting the data transmitter apparatus 301 or the data receiver apparatus 401 to transmit the request information. Examples of the data about the person include personal data, and analysis result data (data generated based on the personal data) acquired by analyzing the personal data. Hereinafter, in a case where it is simply described as data, the description means data about the person, which may be any of personal data, and analysis result data. The request information is, for example, information for requesting disclosure of data to another business operator, a data use (analysis etc.), or acquirement of data from the person. The disclosure of data to another business operator means at least one of data reception and retention (holding) in view from the other business operator. Accordingly, request for providing data includes a request for at least one of data reception and retention (holding). The data management apparatus 101 acquires, from the first storage system 201, consent information (the record related to the consent) that includes a consent condition of the person's consent to performing the process on this person's data. The data management apparatus 101 determines whether the process is executable to the data, on the basis of the acquired consent information and the request information. The data management apparatus 101 performs the process on the data, according to the determination result of whether execution is possible. When the data management apparatus 101 performs the process, this system creates record that indicates the content of the process and the like, and registers the record in the first storage system 201.

The owner apparatus 501 is an apparatus operated by the person who is the owner of the personal data. The owner apparatus 501 is, for example, a note-type or desktop-type personal computer (PC), a smartphone, a tablet terminal, etc. The person can register at least one piece of consent information, in the first storage system 201, from the owner apparatus 501. The person can transmit personal data from the owner apparatus 501 to the data management apparatus 101. That is, the data management apparatus 101 can receive (acquire) the personal data from the owner apparatus 501.

The first storage system 201 stores consent information on one or more people. The first storage system 201 stores a history of record indicating the content and the like of processes performed in the data management apparatus 101. The first storage system 201 is a system that can store information. In the first storage system 201, a part that stores the consent information corresponds to a consent information storage, and a part that stores the history of the record corresponds to a record storage. The first storage system 201 is, for example, a blockchain system or a database. In the case where the first storage system 201 is a blockchain system, the consent information and the record may be managed as respective transactions by the same blockchain, or managed by different blockchain systems. Also in the case where the first storage system 201 is a database, the consent information and the record may be managed by the same database, or managed by different databases.

The data transmitter apparatus 301 is an apparatus that requests the data management apparatus 101 to process (provide, use (analyze or the like), acquire or the like) data, such as personal data. Alternatively, the data transmitter apparatus 301 may receive a request for data processing issued by an apparatus or a system of a business operator that manages the data management apparatus 101 (an apparatus or a system other than the data management apparatus 101 shown in the diagram) or the owner apparatus 501. The data transmitter apparatus 301 may request the data management apparatus 101 to process data on the basis of the request. The data transmitter apparatus 301 is operated by, for example, a staff member (user) working at the business operator that manages the data transmitter apparatus 301. The data transmitter apparatus 301 transmits the request information to the data management apparatus 101. Alternatively, the data transmitter apparatus 301 receives the request, and depending on the request, transmits the request information to the data management apparatus 101. Depending on the type of the request information, data serving as a processing target is also transmitted to the data management apparatus 101. The data transmitter apparatus 301 may be another data management apparatus (an apparatus having a configuration equivalent to that of the data management apparatus 101) different from the data management apparatus 101. The business operator that manages the data management apparatus 101 and the business operator that manages the data transmitter apparatus 301 may be the same business operator. The business operator that manages the data management apparatus 101 and the business operator that manages the data transmitter apparatus 301 may be different business operators. The data transmitter apparatus 301 may be the same as the owner apparatus 501, in some cases.

The data receiver apparatus 401 is an apparatus that receives data (personal data, analysis result data or the like) from the data management apparatus 101. The data receiver apparatus 401 may receive a request for data processing (providing, using (analyzing or the like) or the like) issued by an apparatus or a system of the business operator that manages the data management apparatus 101 (an apparatus or a system other than the data management apparatus 101 shown in the diagram) or the owner apparatus 501. The data receiver apparatus 401 may request the data management apparatus 101 to process data on the basis of the request. The data receiver apparatus 401 may request the data management apparatus 101 to process (provide, use (analyze or the like), acquire or the like) receiver apparatus 401 is data, such as personal data. The data operated by, for example, a staff member (user) working at the business operator that manages the data receiver apparatus 401. The data receiver apparatus 401 may transmit the request information to the data management apparatus 101. Alternatively, the data receiver apparatus 401 may receive the request, and transmits request information to the data management apparatus 101 in accordance with the request. The data receiver apparatus 401 receives data from the data management apparatus 101. The data receiver apparatus 401 may be another data management apparatus (an apparatus having a configuration equivalent to that of the data management apparatus 101) different from the data management apparatus 101. The business operator that manages the data management apparatus 101 and the business operator that manages the data receiver apparatus 401 may be the same business operator. The business operator that manages the data management apparatus 101 and the business operator that manages the data receiver apparatus 401 may be different business operators.

The business operator of the data receiver apparatus 401 and the business operator of the data transmitter apparatus 301 may be the same as each other. The data receiver apparatus 401 and the data transmitter apparatus 301 may be the same apparatus. The business operator of the data management apparatus 101 may be the same as at least one of the business operators of the data transmitter apparatus 301 and the data receiver apparatus 401.

Hereinafter, "personal data", "consent information" and "request information" are described.

FIG. 2 shows personal data 1 and attribute information 1 as examples of the personal data and its attribute information. The attribute information includes one or more attributes of the personal data. The attribute information on the personal data 1 is the attribute information 1. The attribute information 1 includes an owner identifier of the data, the data type (type), and one or more data details (details). In some cases, the details are not included. In the example in FIG. 2, a detail 1, a detail 2, and a detail 3 are shown.

The owner identifier is an identifier assigned to the owner (person) of the data. In this embodiment, the owner identifier has a common value among the data management apparatus 101, the first storage system 201, the second storage system 601, the data transmitter apparatus 301, the data receiver apparatus 401, and the verification apparatus 1. The values of the type and the details are identifiers, character strings, date type data or numerals, etc.

FIG. 3A shows examples of the types and details of data. The types are represented as data type identifiers. The details are represented as data detail identifiers. The data type identifier "T0001" indicates healthcare data. "T0001" is associated with data detail identifiers "D0001", "D0002" and "D0003". "D0001", "D0002" and "D0003" represent the body temperature, the body weight and the number of steps, respectively.

In the aforementioned example in FIG. 2, the detail 1 has a value "D0001". The detail 2 indicates the date. The detail 3 indicates any numeral (e.g., an index number etc.). The personal data 1 in FIG. 2 includes values of body temperatures of the person having the owner identifier "U000001" on the respective days in August 2020.

FIG. 3B shows examples of business operator identifiers. FIG. 3C shows examples of identifiers (purpose identifiers) indicating purposes of data processing. FIG. 3D shows examples of withdrawal identifiers for handling at withdrawal of consent information. The information in FIG. 3B to FIG. 3D is used for consent information, request information and the like, which are described later.

Next, the consent information is described. The consent information includes the consent information identifier, owner identifier, data type (type), details, one or more business operators, consent target event, consent state to the event (consent/nonconsent), consent time period, handling at withdrawal, and consent date and time. The details are not included, in some cases.

At the right of FIG. 4, consent information 7 (consent to indirect acquisition) is indicated as an example of the consent information. The consent information 7 includes the consent information identifier, owner identifier, type, details, provider business operator, receiver business operator, consent target event, consent state to the consent target (consent/nonconsent), consent time period, handling at withdrawal, and consent date and time. The consent information does not include the details, in some cases. The consent target event is, for example, data reception by the receiver business operator, data retention by the receiver business operator, use for a reception or retention purpose, and storing of consent information and record. The receiver business operator is a business operator that receives data, and retains or stores the received data, in some cases. The consent information identifier is information for identifying the consent information.

At the right of FIG. 5, consent information 3 (consent to direct acquirement) is indicated as another example of the consent information. The consent information 3 includes the consent information identifier, owner identifier, type, details, acquirer business operator, consent target event, consent state to the consent target (consent/nonconsent), consent time period, handling at withdrawal, and consent date and time. The consent information does not include the details, in some cases. The consent target event is, for example, data acquirement by the acquirer business operator, data retention (storing) by the acquirer business operator, use for an acquiring purpose, and storing of consent information and record. The acquirer business operator is a business operator that acquires the personal data from the owner apparatus 501 of the person or the data transmitter apparatus 301, and is a business operator ("C001") of the data management apparatus 101 in the example in the diagram.

Next, the request information is described. The request information is information for requesting the data management apparatus 101 to perform a process. The type of request is, for example, disclosure, use (analysis or the like), and acquirement.

At the center of FIG. 4, request information 1 is indicated as an example of request information in a case where the request type is disclosure. When the type of the request is disclosure, the request information includes the owner identifier, data type (type), details, provider business operator, receiver business operator, and one or more purposes of reception and retention (storing) of the receiver business operator. The request information 1 does not include the details, in some cases. The disclosure requests the providing target business operator to perform reception and retention (holding).

At the center of FIG. 5, request information 2 is shown as an example of request information in a case where the request type is acquirement. When the type of the request is acquirement, the request information includes the owner identifier, data type (type), details, acquirer business operator, and one or more purposes of acquirement of the acquirer business operator. The request information 2 does not include the details, in some cases.

At the center of FIG. 6, request information 3 is shown as an example of request information in a case where the request type is use. When the request type is use, the request information includes the owner identifier, data type (type), details, use business operator (analysis business operator in the example in the diagram), and one or more purposes of data use by the use business operator (an analysis business operator in the example in the diagram). The request information 3 does not include the details, in some cases. The data use includes performing of a certain process on data (first data) to generate new data (second data). For example, healthcare data is analyzed to generate analysis result data regarding the health condition.

Hereinafter, each component of the data management apparatus 101 is described. The data management apparatus 101 includes a data holding device 11, a consent information acquirer 12, a determination processor 13, a history registrar 14, an input device 15, an output device 16, and a data analyzer 17. All or part of the information acquirer 12, the determination processor 13, the history registrar 14 and the data analyzer 17 may be configured by processing circuitry as one example. Elements included in the data management apparatus 101 are not limited thereto. For example, this system may include: an input interface that receives information or an instruction, and an output interface, such as a display device that displays information or data.

The input device 15 receives request information for a process (disclosure, use (analysis etc.), acquirement or the like), from the data transmitter apparatus 301, or the data receiver apparatus 401, or the owner apparatus 501, or an apparatus or a system of the business operator that manages the data management apparatus 101, and transmits the received request information to the determination processor 13. The input device 15 is an example of a receiving unit or receiving circuitry that receives the request information. The input device 15 receives data (personal data etc.) on the person from the data transmitter apparatus 301, and transmits the received data to the data holding device 11. As described above, the input device 15 may receive at least one of the request information and the data, from an apparatus other than the data transmitter apparatus 301. For example, at least one of the request information and the data may be received from an apparatus operated by an administrator of the data management apparatus 101, the owner apparatus 501 or the like.

The determination processor 13 receives the request information from the input device 15, and transmits an instruction for acquiring the consent information, on the basis of the received request information, to the consent information acquirer 12.

The consent information acquirer 12 requests the first storage system 201 to read the consent information having the coincident owner identifier on the basis of the request information, and receives the consent information from the first storage system 201. The consent information acquirer 12 may receive, from the first storage system 201, only the latest consent information (for example, the consent information having the latest consent date). The consent information acquirer 12 may receive all the pieces of consent information, or all the pieces of consent information in a certain time period. All the pieces of consent information having the coincident owner identifier may be received. In the request information, consent information where the owner identifier and other one or more items coincide may be received.

The determination processor 13 receives the consent information acquired by the consent information acquirer 12, and determines whether the process requested by the request information is executable, on the basis of whether the request information satisfies the consent information. The determination processor 13 transmits information indicating the determination result, to the data holding device 11 and the output device 16.

A first example of a determination method by the determination processor 13 is described with reference to the aforementioned FIG. 4.

The request information is assumed to be the request information 1 in FIG. 4. The consent information is identified that has coincident comparison items, such as the owner identifier, type, details, provider business operator, receiver business operator, and reception (or retention) purpose by the receiver business operator in the request information 1. As for the purpose, it is only required that the purpose of the consent information includes the purpose of the request information 1; a purpose that is not in the request information 1 may be included in the consent information. When all of the consent state to data reception by the receiver business operator, the consent state to the data retention (data holding) by the receiver business operator, and the consent state to the purpose included in the request information 1 are "CONSENT" in the identified consent information, the request information 1 satisfies the consent information. Any purpose that is not in the request information 1 may be nonconsent in the consent information. If there are multiple identified pieces of consent information, each consent state is determined for the latest consent information. If the request information 1 satisfies the consent information, the process requested by the request information 1 is determined to be executable. The consent information 7 in FIG. 4 is consent information that the request information 1 satisfies. Consequently, when the consent information 7 is acquired, the process requested by the request information 1 is determined to be executable. If there is no consent information that the request information 1 satisfies, the process requested by the request information 1 is determined to be inexecutable. For example, even if there is consent information having coincident comparison items, the process where the consent state is "NONCONSENT" is determined to be inexecutable. It can be determined whether the information is latest or not, for example, on the basis of the consent date (consent date and time) included in the consent information. Alternatively, a timestamp may be assigned to the consent information to be registered in the first storage system 201, and determination may be made on the basis of the timestamp.

A second example of the determination method by the determination processor 13 is described with reference to the aforementioned FIG. 6. The request type of the request information 3 shown in FIG. 6 is use. The consent information is identified where all the owner identifier, the type and the details of the request information 3 coincide, the use business operator (analysis business operator in this example) of the request information 3 coincides with the use business operator of the consent information, and the purpose coinciding with the use purpose of the business operator of the request information 3 is included. As for the purpose, it is only required that the purpose of the consent information includes the purpose of the request information 3; a purpose that is not in the request information 3 may be included in the consent information. If all the consent states to the use purpose included in the request information 3 are "CONSENT" in the identified consent information, the request information 3 satisfies the consent information. The purpose that is not in the request information 3 may be nonconsent in the consent information. If there are multiple identified pieces of consent information, each consent state is determined for the latest consent information. If the request information 3 satisfies the consent information, the process requested by the request information 3 is determined to be executable. The aforementioned consent information 7 in FIG. 6 is consent information that the request information 3 satisfies. If there is no consent information that the request information 3 satisfies, the process requested by the request information 3 is determined to be inexecutable. For example, even if there is consent information having coincident comparison items, the process where the consent state is "NONCONSENT" is determined to be inexecutable.

A third example of the determination method by the determination processor 13 is described with reference to the aforementioned FIG. 5. The request type of the request information 2 shown in FIG. 5 is acquirement. The consent information is identified where all the owner identifier, the type and the details of the request information 2 coincide, the acquirer business operator (the business operator of the data management apparatus 101 in this example) of the request information 2 coincides with the acquirer business operator of the consent information, and the purpose coinciding with the acquirement purpose of the business operator of the request information 2 is included. As for the purpose, it is only required that the consent information indicates consent to the purpose of the request information 2; it may be nonconsent to a purpose that is not in the request information 2. If all the consent states to the purpose included in the request information 2 are "CONSENT" in the identified consent information, the request information 2 satisfies the consent information. If there are multiple identified pieces of consent information, each consent state is determined for the latest consent information. If the request information 2 satisfies the consent information, the process requested by the request information 2 is determined to be executable. The aforementioned consent information 4 in FIG. 5 is consent information that the request information 2 satisfies. If there is no consent information that the request information 2 satisfies, the process requested by the request information 2 is determined to be inexecutable. For example, even if there is consent information having coincident comparison items, the process where the consent state is "NONCONSENT" is determined to be inexecutable.

When the request information requests a process of providing data (e.g., personal data) for the data management apparatus 101 (data holding and reception by the data management apparatus 101), the data holding device 11 receives, from the input device 15, the data to be held. If the determination result by the determination processor 13 indicates that the process is executable, the data is stored in the internal storage. If inexecutable, the data is deleted. After the determination processor 13 determines that the process is executable, the input device 15 may receive the data from the data transmitter apparatus 301. In this case, if the process is determined to be inexecutable, the data is not received, which negates the need of an operation of deleting the data.

When the request information requests a process of providing (transmitting) data (e.g., personal data) for the data receiver apparatus 401, the data holding device 11 reads the data from the internal storage after the process is determined to be executable by the determination processor 13. The data holding device 11 transmits the data to the data receiver apparatus 401 via the output device 16. Note that the transmission destination of the data may be an apparatus other than the data receiver apparatus 401, in some cases.

When the request information requests a process of using (for example, analyzing) data (e.g., personal data), the data holding device 11 reads one or more data items to be analyzed from the internal storage after the process is determined to be executable by the determination processor 13, and transmits the data items to the data analyzer 17.

The data analyzer 17 performs a predetermined analysis on the data, and transmits analysis result data to the data holding device 11. The analysis result data includes attribute information. The attribute information includes multiple attributes of the analysis result data. The data holding device 11 stores the analysis result data in the internal storage. If the data analysis request includes a request for providing analysis data, the data holding device 11 transmits the analysis result data to the output device 16.

The output device 16 transmits the determination result of whether execution of the process is possible by the determination processor 13, to the data transmitter apparatus 301 or to the data receiver apparatus 401 wherein the data transmitter apparatus 301 or the data receiver apparatus 401 is the originator of the request information. The determination result may be transmitted to the owner apparatus 501, or an apparatus or a system of the business operator that manages the data management apparatus 101 wherein the owner apparatus 501 or the apparatus or the system of the business operator that manages the data management apparatus 101 is the originator of the request information. The output device 16 transmits the data (the personal data, analysis result data, etc.) received from the data holding device 11, to the data receiver apparatus 401 of the business operator designated as the receiver business operator, the use business operator, the acquirer business operator or the like. Note that the use business operator or the acquirer business operator is the business operator of the data management apparatus 101. In a case where the data transmitter apparatus 301 or the data receiver apparatus 401 is the apparatus identical to the data management apparatus 101, transmission is not required. The output device 16 is an example of a transmitter or transmitting circuitry that transmits the determination result, data or the like.

The history registrar 14 generates record that indicates the content of the process in order to record the history of processes performed by the data holding device 11. The record includes the attribute information. The attribute information includes the multiple attributes of the record. Examples of the processes include disclosure, use (analysis etc.), acquirement and the like of data (personal data, analysis result data or the like). In a case where a business operator that receives data exists, reception record may be generated. The history registrar 14 transmits the record to the first storage system 201. The first storage system 201 registers the received record in this system. The record may be used for an audit.

Referring to FIGS. 4 and 7, specific examples of generating the record information are described.

FIG. 4 shows attribute information 2, request information 1, and consent information 7, as examples of the attribute information on the personal data, request information, and consent information. The request information 1 requests providing of the personal data on the attribute information 2 from a business operator "C002" (provider business operator) to a business operator "C001" (receiver business operator). The request information 1 satisfies the consent information 7.

At the left of FIG. 7, an example of disclosure record is shown. The disclosure record includes a record identifier, a record type ("DISCLOSURE" in this example), a record business operator (provider business operator) having performed recording in the first storage system 201, the name of the receiver business operator, the consent information identifier, information identifying the personal data (the owner identifier, type, details, etc.), and date and time (providing date and time). After the personal data is provided, the history registrar 14 of the data management apparatus 101 generates the disclosure record.

At the right of FIG. 7, an example of reception record is shown. The reception record includes a record identifier, a record type ("RECEPTION" in this example), a record business operator (receiver business operator) having performed recording in the first storage system 201, the name of the provider business operator, the consent information identifier, way of acquirement, information identifying the data (the attributes of the data), and providing date and time. The way of acquirement designates document 1 that includes information on how a provider has acquired the personal data. The document 1 is, for example, a personal data sales contract, a contract indicating the way of acquirement, a provider's website that indicates the way of acquirement, writing stating that the provider has received the consent of the person concerned, consent information or the like. The apparatus (the data management apparatus 101 in this example) of the business operator "C001" having received the personal data generates reception (holding) record on the personal data, and registers the record in the first storage system 201.

In a case where the business operator of the data management apparatus 101 is the provider business operator, the data management apparatus 101 creates disclosure record, and registers the record in the first storage system 201. The apparatus of the receiver business operator (e.g., the business operator of the data receiver apparatus 401) creates reception record, and stores the record in the apparatus of the receiver business operator. Alternatively, the apparatus of the receiver business operator may register the record in the first storage system 201. That is, the first storage system 201 may be shared between the business operators, and the record may be registered in the first storage system 201 identical between the provider business operator and the receiver business operator. On the other hand, in a case where the business operator of the data management apparatus 101 is the receiver business operator, the data management apparatus 101 creates reception record, and registers the record in the first storage system 201. The apparatus of the provider business operator (e.g., the business operator of the data transmitter apparatus 301) creates disclosure record, and stores the record in the apparatus of the provider business operator. Alternatively, the apparatus of the provider business operator may register the record in the first storage system 201.

Referring to FIGS. 6 and 8, other specific examples of the record are described.

FIG. 6 shows attribute information 2, request information 3, and consent information 7, as examples of the attribute information on the personal data, request information, and consent information, respectively. The request information 3 requests use (analysis is herein assumed) of the personal data on the attribute information 3 by a business operator "C001" (retention business operator). The request information 2 satisfies the consent information 7.

The history registrar 14 of the data management apparatus 101 generates analysis record on the basis of the data analysis result by the data analyzer 17. More specifically, the data analyzer 17 of the data management apparatus 101 (business operator "C001") analyzes the personal data having the attribute information 2, and generates analysis result data. The analysis result data is an example of data (generated data) generated through use of data. The analysis result data (generated data) includes a data main body, and attribute information. The analysis result data is held in the data holding device 11. The history registrar 14 creates record on use (here, analysis) on the basis of the analysis result data.

At the left of FIG. 8, attribute information 3 is shown as an example of attribute information on the analysis result data (generated data). At the right of FIG. 8, an example of analysis record is shown. The analysis record includes a record identifier, a record type ("GENERATION" in this example), a record business operator (analysis business operator) having performed recording in the first storage system 201, a consent information identifier, information identifying one or more used data items (a use data owner identifier, use data type, use data details, etc.; in this example, information on the attribute information 2), and information identifying the generated data (generated data owner identifier, generated data type, generated data details, date and time when the generated data was generated). The information identifying the generated data corresponds to the attribute information 3 in this example.

Referring to FIGS. 5 and 9, other specific examples of the record are described.

FIG. 5 shows attribute information 1, request information 2, and consent information 3, as examples of the attribute information on the personal data, request information, and consent information, respectively. The request information 2 requests acquirement of the personal data on the attribute information 2 by the business operator "C001" from the person. The request information 2 satisfies the consent information 3.

The history registrar 14 of the data management apparatus 101 generates the acquirement record on the basis of acquirement of the personal data.

FIG. 9 shows an example of an acquirement record. The acquirement record includes the record identifier, record type, record business operator (acquirer business operator), consent information, information identifying the acquired data (information on the attribute information 1 in this example), and acquirement date and time.

In the first embodiment, the owner identifier has a common value among the data management apparatus 101, the first storage system 201, the data transmitter apparatus 301, and the data receiver apparatus 401. Among the items included in the record related to the process, the same items as those of the consent information referred to by the record related to the process (the record related to the consent) may be omitted by means of referring to the record related to the consent. The items to be omitted include, for example, the owner identifier, the type, and the details, in terms of the records related to the process.

The log holding device 21 of the second storage system 601 stores a log of writing to the data holding device 11, a log of reading from the data holding device 11, and a log of deletion in the data holding device 11. These logs are collectively called data access logs. The holding lives of the logs in the second storage system 601 may be shorter than the holding lives of the records in the first storage system 201. The user (verifier) who operates or manages the verification apparatus 1 may be the owner or the auditor. The second storage system 601 may be a log management system provided by a cloud business operator. In a case where the record business operator cannot falsify the log, the reliability of consistency verification provided by this embodiment is improved.

The verification apparatus 1 includes an input device 1A, and a processor 1B. The processor 1B includes an acquirer 1C, and a verifier 1D.

The input device 1A accepts various types of instructions issued by the user. The input device 1A receives a verification request for consistency of a record from the user, for example. The verification request may include a condition regarding a verification target. The condition regarding the verification target may include at least one of an identifier for identifying a person, and an identifier for identifying a business operator. The condition regarding the verification target may include a condition regarding the time period for intended verification. The condition regarding the verification target may include another condition.

When the processor 1B receives a verification request for consistency, the processor 1B performs a verification process for consistency using the acquirer 1C and the verifier 1D. The acquirer 1C acquires the record (at least one of the record related to the process and the record related to consent) from the first storage system 201. The acquirer 1C acquires a log (a log of an operation performed in relation to at least one of the process and consent) from the second storage system 601. The acquirer 1C may acquire a record satisfying the condition included in the verification request, from the first storage system 201, and acquire a log satisfying the condition included in the verification request, from the second storage system 601.

The verifier 1D verifies consistency of the acquired record, based on the acquired log. For example, the verifier 1D verifies the consistency between a record (a record related to the process or a record related to consent) and a data access log. When the log of the operation corresponding to the process or the consent indicated by the acquired record is not included in the acquired log, the verifier 1D determines that there is no consistency. When the record indicating the process or the consent corresponding to the operation indicated by the acquired log is not included in the acquired record, the verifier 1D determines that there is no consistency. A case is assumed where when a plurality of operations are performed in relation to one process (for example, writing to and reading from the data holding device 11), a plurality of logs corresponding to the respective operations are stored in the second storage system 601. The verifier 1D acquires the logs corresponding to the respective operations performed for the one process, from the second storage system 601, and identifies the log corresponding to the operation performed last among the acquired logs. When the records indicating the process corresponding to the operation indicated by the identified log is not included in the acquired record, it may be determined that there is no consistency.

The processor 1B may verify the consistency between the record related to the consent and the record related to the process, besides verification of consistency between the record and the log, as consistency of the record (at least one of the record related to the process and the record related to the consent). For example, the acquirer 1C acquires the record related to the process and the record related to the consent from the first storage system 201, based on the condition included in the verification request. When the record related to the consent to the process indicated by the record related to the process cannot be acquired, the processor 1B determines that there is no consistency. When a consent time period or a nonconsent time period is acquired or calculated based on the record related to the acquired consent, and the time (e.g., the date and time) of process indicated by the record related to the process is not included in the consent time period or is included in the nonconsent time period, it is determined that there is no consistency.

The processor 1B may record a verification result in the verification apparatus 1, the second storage system 601, or another apparatus. When the verification result is recorded, part of or the entire data access log (e.g., the log used for verification) may be deleted from the second storage system 601. The processor 1B may transmit instruction data for an instruction for deleting part of or the entire data access log, to the second storage system 601, and the second storage system 601 may delete the part of or the entire data access log, based on the instruction data. In this case, the verification of consistency between the record and the log may be performed in segmented time periods.

Figure 10:
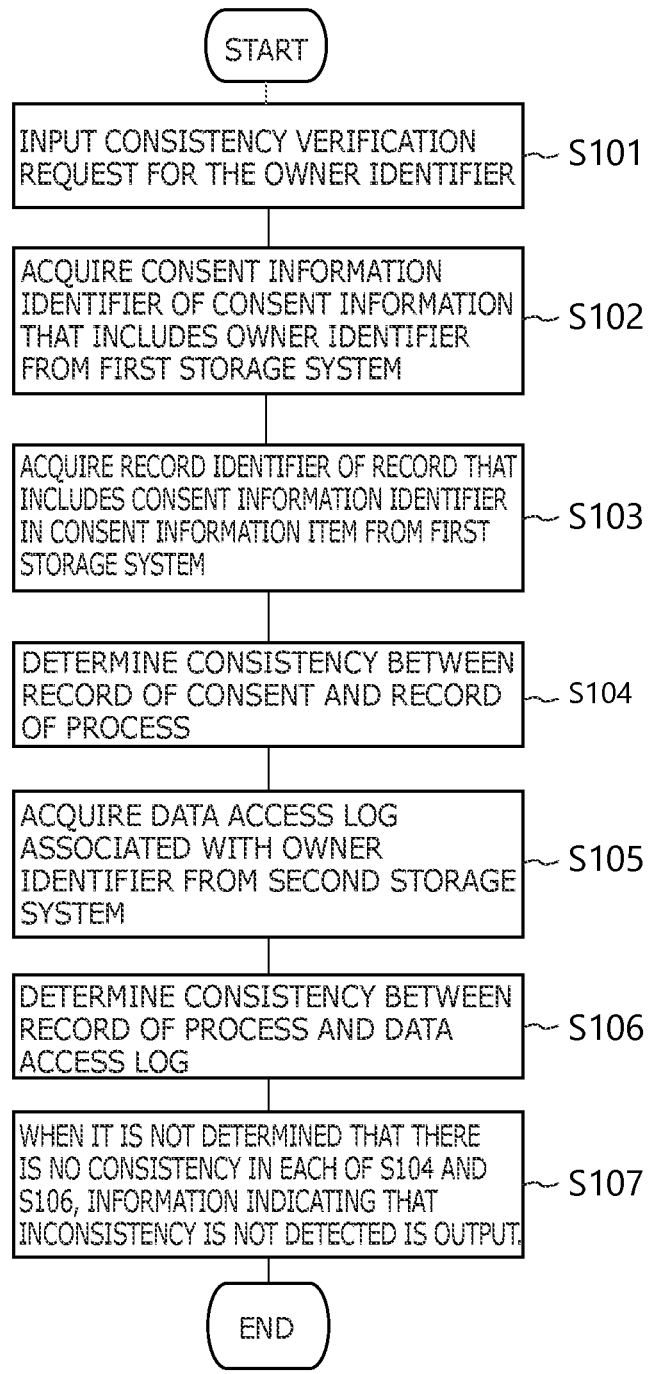
FIG. 10 is a flowchart of an example of processes according to the first embodiment.

FIG. 10 is a flowchart of an example of processes according to the first embodiment. In the processes, the verification apparatus 1 verifies the consistency between the record related to the process and the data access log on an owner-by-owner basis.

Step S101: the verification apparatus 1 receives a consistency verification request for the owner identifier. For example, the user designates the owner identifier using an operation device (a keyboard, a mouse, a touch panel or the like), presses a button for designating the consistency verification in an application window displayed on a screen.

Step S102: the verification apparatus 1 acquires the consent information identifier of consent information that includes the owner identifier, from the first storage system 201.

Step S103: the verification apparatus 1 acquires the record identifier of the record that includes the consent information identifier in the consent information item, from the first storage system 201. When the owner identifier is included in the record related to the process, the record identifier of the record that includes the owner identifier may be acquired from the first storage system 201.

Step S104: the verification apparatus 1 verifies the consistency between the record related to the consent (consent information) and the record related to the process (record). For example, it is verified whether acquirement of consent by the owner to the process indicated by the record is identified based on the consent information or not. The method of verification is not limited to a specific one.

The types of consent include consent regarding indirect acquirement (consent to indirect acquirement), and consent regarding direct acquirement (consent to direct acquirement). The indirect acquirement corresponds to reception of data provided by a third party. The direct acquirement corresponds to acquirement of data provided by the owner. The consent to indirect acquirement and the consent to direct acquirement are also collectively called consent to holding. Another type of consent is consent corresponding to disclosure of data by a third party (consent to disclosure).

Verification of consistency between the record related to the process and the data access log includes record-originated verification, and log-originated verification. In the log-originated verification, simple comparison is not allowed. The details are described as follows. In receipt or acquirement of personal data, the personal data is received via the communication network, consent to indirect acquirement or consent to direct acquirement is then verified, and when any record related to the consent does not exist or the consent state is nonconsent, operations without writing the personal data in the data holding device 11 are permitted. In disclosure of personal data, the personal data is read from the data holding device 11, the consent to disclosure is then verified, and when any record related to the consent does not exist or the consent state is nonconsent, operations without transmitting the personal data to a disclosure destination via the communication network are permitted. In generation of personal data, the personal data is read from the data holding device 11, consent to indirect acquirement or consent to direct acquirement is then verified, and when any record related to the consent does not exist or the consent state is nonconsent, operations without writing the personal data in the data holding device 11 not accompanied by generation of the personal data are permitted. That is, the last log of a series of operations in the process corresponds to the record related to the process.

Correspondence between the record and the log indicates that a description that identifies data in a record related to consent (the type, details, etc.) and is referred to by the record related to the process coincides with the description of identifying data in the data access log, or that the latter is included as a subset of the former (requirement 1-1-1). A case where a description of identifying data is included in the record related to the process indicates that a description of identifying data in the record related to the process (the type, details, etc.) coincides with the description of identifying data in the data access log, or that the latter is included as a subset of the former (requirement 1-1-2). A requirement that the date and time identified in the record related to the process (year, month and day) and the date and time identified in the data access log are close to each other with reference to a threshold (a requirement 1-1-3) may be added to the requirement 1-1-1 or the requirement 1-1-2. The threshold may be preliminarily fixed, or allowed to be changed by a user input.

A detailed operation of verification between the record related to the process and the data access log is described later.

Step S105: the verification apparatus 1 acquires the data access log associated with the owner identifier from the second storage system 601.

Step S106: the verification apparatus 1 verifies consistency between the record related to the process including a target record business operator among the records including the record identifier acquired in step S103 and the data access log. The record business operator as a target may be preliminarily fixed or allowed to be changed by a user input. Hereinafter, an example of an operation of verifying consistency is described.

In the record-originated verification, it is determined that there is no consistency when the corresponding writing log does not exist with respect to the receipt record that includes the consent information identifier of the consent to indirect acquirement or the consent to disclosure, in the consent information item. It is determined that there is no consistency when the corresponding reading log does not exist with respect to the disclosure record that includes the consent information identifier of the consent to indirect acquirement or the consent to disclosure, in the consent information item. It is determined that there is no consistency when the corresponding writing log does not exist with respect to the acquirement record that includes the consent information identifier of the consent to direct acquirement, in the consent information item. It is determined that there is no consistency when the corresponding reading log or the corresponding writing log does not exist with respect to the generation record that includes the consent information identifier of the consent to indirect acquirement or the consent to direct acquirement, in the consent information item. It is determined that there is no consistency when the corresponding deletion log does not exist with respect to the deletion record that includes the consent information identifier of the consent to indirect acquirement or the consent to direct acquirement, in the consent information item.

In the log-originated verification, it is determined that there is no consistency when the corresponding acquirement record, receipt record, or generation record does not exist with respect to the writing log. It is determined that there is no consistency when the corresponding deletion record does not exist with respect to the deletion log.

When the verification apparatus 1 determines that there is no consistency with respect to at least one of the record origination and the log origination, this apparatus determines that inconsistency is detected (without consistency).

Step S107: when inconsistency is detected neither in step S104 nor S106, the verification apparatus 1 determines that inconsistency is not detected as a whole. The verification apparatus 1 may output information indicating that inconsistency is not detected as a whole (for example, display it on screen). When it is determined that there is no consistency in at least one of steps S104 and S106, it is determined that inconsistency is detected as a whole. The verification apparatus 1 may output information indicating that inconsistency is detected as a whole. In this case, information for identifying which of steps S104 and S106 has detected inconsistency may be displayed on screen together.

The order of the consistency verification performed in step S104 and the consistency verification performed in step S106 may be inverted. Alternatively, both the steps may be executed in parallel. When it is determined that there is no consistency in at least one of steps S104 and S106, the other consistency verification is not necessarily executed. When inconsistency is detected as a whole, information on a site causing determination that there is no consistency may be output.

Hereinafter, an example of the operation of each step in the flowchart of FIG. 10 is specifically described.

Example 1

Step S101: the verification apparatus 1 receives a consistency verification request for the owner identifier "U000001".

Step S102: the verification apparatus 1 acquires the consent information identifier "C000007" (consent to indirect acquirement) of consent information that includes the owner identifier "U000001" from the first storage system 201.

Step S103: the verification apparatus 1 acquires "R000001" (disclosure record), "R000002" (receipt record) and "R000004" (generation record), as the record identifiers of records that include the consent information identifier ("C000007") in the consent information item, from the first storage system 201. In this example, since the owner identifier is included in the record related to the process, the record identifiers ("R000001", "R000002" and "R000004") of records that include "U000001" as the owner identifier may be acquired from the first storage system 201.

Step S104: the verification apparatus 1 verifies the consistency between the record related to the consent and the record related to the process. It is determined that inconsistency is not detected.

Step S105: the verification apparatus 1 acquires the data access log associated with the owner identifier ("U000001") from the second storage system 601.

FIG. 11 shows an example of a data access log 1-1. The types of the data access log include writing, reading, and deletion. It is described that the record business operator of the data access log is "C001", and "C001" corresponds to the data management apparatus 101. More specifically, it may be assumed that the first and second rows correspond to the input device 15, and the third and fourth rows correspond to the data analyzer 17. Alternatively, it may be assumed that the record business operator is a personal account in charge of personal data processing. The access destination may be a combination of the owner identifier, the type, and details. Alternatively, the access destination may be an address in the second storage system 601. In this case, data indicating correspondence between the address, the owner identifier, the type, and details may be held in another table. The date and time is a date and time of execution of the data access, and may have a lower granularity than the date and time of the record related to the process does.

In this example, in order to acquire the data access log associated with the owner identifier ("U000001"), logs on the first, third and fourth rows of the data access log 1-1 are acquired, Based on the acquired log, the target record business operator is "C001", and the record identifiers "R000002" and "R000004" of records including "C001" are acquired from among the record identifiers ("R000001", "R000002" and "R000004").

Step S106: the verification apparatus 1 verifies the consistency between the record including the acquired record identifier, and the data access log. In the record-originated verification, the first row of the data access log corresponds to the record with the record identifier "R000002", and the third and fourth rows of the data access log correspond to the records with the record identifier "R000004". In the record-originated verification, inconsistency is not detected. In the log-originated verification, the record with the record identifier "000002" corresponds to the first row of the data access log, and the record with the record identifier "R000004" corresponds to the fourth row of the data access log. In the log-originated verification, inconsistency is not detected. Consequently, it is determined that inconsistency is detected neither in the record related to the process nor in the data access log.

Step S107: since inconsistency is detected neither in step S104 nor S106, the verification apparatus 1 determines that inconsistency is not detected as a whole.

Example 2

Step S101: the verification apparatus 1 receives a consistency verification request for the owner identifier "U000002".

Step S102: the verification apparatus 1 acquires the consent information identifiers "C000003" and "C000010" (consent to direct acquirement) of consent information that includes the owner identifier "U000002" from the first storage system 201.

Step S103: the verification apparatus 1 acquires the record identifier "R000003" (acquirement record) and "R000005" (deletion record) of the records that include the consent information identifiers "C000003" and "C000010" in the consent information item, from the first storage system 201.

FIG. 12 shows an example of the record (record of deletion) with the record identifier "R000005". Since the owner identifier is included in the record related to the process in this example, the record identifiers "R000003" and "R000005" of records that include the owner identifier "U000002" may be acquired from the first storage system 201.

Step S104: the verification apparatus 1 verifies the consistency between the record related to the consent and the record related to the process. It is determined that inconsistency is not detected.

Step S105: the verification apparatus 1 acquires the data access log associated with the owner identifier "U000002" from the second storage system 601. Logs on the second and fifth rows of the data access log in FIG. 11 are acquired. It is assumed that the record business operator as a target is "C001". The record business operator of both the records with the aforementioned record identifiers "R000003" and "R000005" is "C001".

Step S106: the verification apparatus 1 verifies the consistency between the record and the data access log. In the record-originated verification, it is determined that the second row of the data access log corresponds to the record with the record identifier "R000003", and the fifth row of the data access log corresponds to the record with the record identifier "R000005". In the record-originated verification, inconsistency is not detected. In the log-originated verification, the record with the record identifier "R000003" corresponds to the second row of the data access log, and the record with the record identifier "R000005" corresponds to the fifth row of the data access log. In the log-originated verification, inconsistency is not detected. Consequently, it is determined that inconsistency between the record related to the process and the data access log is not detected.

Step S107: since inconsistency is detected neither in step S104 nor S106, the verification apparatus 1 determines that inconsistency is not detected as a whole.

Example 3

In step S101, without input of the owner identifier, the owner identifier may be acquired from the record related to the consent that the record related to the process held in the first storage system 201 refers to. When the owner identifier is included in the record related to the process, the owner identifier may be acquired from the record related to the process held in the first storage system 201. The owner identifier may be acquired from the data access log held in the second storage system 601.

Example 4

It may be configured so that the verification apparatus 1 does not perform consistency verification between the record related to the process and the data access log on an owner-by-owner basis, and this apparatus may perform the consistency verification in the order of holding in the first storage system 201 or the order of holding in the second storage system 601. Correspondence between the record and the log, and correspondence between the log and the record indicate that a description of identifying data in a record related to consent (the owner identifier, the type, details, etc.) referred to by the record related to the process coincides with the description of identifying data in the data access log, or that the latter is included as a subset of the former. A case where a description of identifying data is included in the record related to the process indicates that a description of identifying data in the record related to the process (the owner identifier, the type, details, etc.) coincides with the description of identifying data in the data access log, or that the latter is included as a subset of the former. There is no substantial difference in determination item about correspondence, but is a difference in whether determination for the owner identifier is performed before or after the other determination.

Hereinafter, an example of the operation in the example 4 is described.

Step S101: the verification apparatus 1 receives a consistency verification request.

Step S102: the verification apparatus 1 acquires the consent information identifiers "C000003" (consent to direct acquirement), "C000007" (consent to indirect acquirement) and "C000010" (consent to direct acquirement) from the first storage system 201.

Step S103: the verification apparatus 1 acquires the record identifiers "R000001" (disclosure record), "R000002" (receipt record), "R000003" (acquirement record), "R000004" (generation record) and "R000005" (deletion record) from the first storage system 201.

Step S104: the verification apparatus 1 performs consistency verification for the record related to the consent and the record related to the process, and determines that inconsistency is not detected.

Step S105: the verification apparatus 1 acquires a data access log from the second storage system 601. Logs are acquired from the first to fifth rows in FIG. 11. It is assumed that the record business operator as a target is "C001". The record identifiers "R000002", "R000003", "R000004" and "R000005" of records including the record business operator "C001" are used.

Step S106: the verification apparatus 1 verifies the consistency between the record and the data access log. In the record-originated verification, it is determined that the first row of the data access log corresponds to the record with the record identifier "R000002", the second row of the data access log corresponds to the record with the record identifier "R000003", the third and fourth rows of the data access log correspond to the records with the record identifier "R000004", and the fifth row of the data access log corresponds to the record with the record identifier "R000005". In the record-originated verification, inconsistency is not detected. In the log-originated verification, it is determined that the record with the record identifier "R000002" corresponds to the first row of the data access log, the record with the record identifier "R000003" corresponds to the second row of the data access log, the record with the record identifier "R000004" corresponds to the fourth row of the data access log, and the record with the record identifier "R000005" corresponds to the fifth row of the data access log. In the log-originated verification, inconsistency is not detected. Consequently, it is determined that inconsistency is detected neither in the record related to the process nor in the data access log.

Step S107: since inconsistency is detected neither in step S104 nor S106, the verification apparatus 1 determines that inconsistency is not detected as a whole.

Example 5

Hereinafter, an example where the verification apparatus 1 determines that there is no consistency in step S106 is described. It is assumed that the record business operator as a target is "C001".

It is assumed that the data access log 1-1 in FIG. 11 held in the second storage system 601 includes no log on the third row. This case corresponds to a case where in step S106, in the record-originated verification, a reading log corresponding to the generation record (FIG. 8) does not exist, Consequently, it is determined that there is no consistency.

It is assumed that the first storage system 201 does not hold records with the record identifiers "R000003" (acquirement record), "R000004" (generation record) and "R000005" (deletion record). In this case, in the verification of consistency between the record related to the consent and the record related to the process in steps S102 to S104, inconsistency is not detected. On the other hand, in the log-originated verification in step S106, the acquirement record, receipt record, and generation record that correspond to the writing log do not exist, and the corresponding deletion record does not exist with respect to the deletion log. Accordingly, it is determined that there is no consistency.

The specific example of the operations of the flowchart in FIG. 10 are described above. However, operations other than the example described above may be adopted.

Modified Example

A modified example where a function is added to improve the reliability is described. Hash values of data are added as items to the receipt record, the acquirement record, and the generation record. In steps S102 to S104, the verification apparatus 1 may calculate the hash value of data held in the data holding device 11, compare the calculated hash value with the hash value of the item in the record, and determine that there is no consistency when the comparison is inconsistent.

In the record related to the consent, instead of the purpose identifier (see FIG. 3C), a consent document that describes a use purpose may be referred to.

The hash value of the consent document may be included as an item of the record related to the consent. In steps S102 to S104, the hash value of the consent document held in the data holding device 11 may be compared with the hash value in the record, and it may be determined that there is no consistency when the comparison is inconsistent.

As for the document referred to by the way of acquiring the receipt record, the hash value of the document may be included as an item. In steps S102 to S104, the hash value of the document held in the data holding device 11 may be compared with the hash value in the record, and it may be determined that there is no consistency when the comparison is inconsistent.

According to the configuration shown in FIG. 1, the second storage system 601 is connected to the data management apparatus 101, and holds the data access log in the data management apparatus 101. According to another configuration example, the second storage system 601 may be connected to the owner apparatus 501, the data transmitter apparatus 301 or the data receiver apparatus 401, and may hold data access logs in the destinations. It is assumed that record business operators as targets are business operators that manage or own connection-destination apparatuses.

The entire data holding device 11 may be searched, it may be verified that specific data does not exist, and the verification result may be used instead of the deletion log. The entire data holding device 11 may be searched, it may be verified that specific data exists, and the verification result may be used instead of the writing log. These verification results can be used as information equivalent to the data access log. In these cases, in verification of the consistency in step S106, the date and time is not required to be compared.

Embodiment 1-2

The verification apparatus 1 verifies the consistency between the record related to the process and the communication log on an owner-by-owner basis. As for the operations of the verification apparatus 1 in the embodiment 1-2, steps S101 to S104 and S107 in the embodiment 1-1 similarly apply to the embodiment 1-2. Operations corresponding to steps S105 and S106 are different from those in the embodiment 1-1.

The consistency verification between the record related to the process and the communication log is performed at the record origination and the log origination. Correspondence between the record and the log indicates that a description of identifying data in a record related to consent (the type, details, etc.) referred to by the record related to the process coincides with the description of identifying data in the communication log, or that the latter is included as a subset of the former (requirement 1-2-1). A case where a description of identifying data is included in the record related to the process indicates that a description of identifying data in the record related to the process (the type, details, etc.) coincides with the description of identifying data in the communication log, or that the latter is included as a subset of the former (requirement 1-2-2). A requirement that the date and time identified in the record related to the process (year, month and day) and the date and time identified in the communication log are close to each other with reference to a threshold (a requirement 1-2-3) may be added to the requirement 1-2-1 or the requirement 1-2-2. The threshold may be preliminarily fixed, or allowed to be changed by a user input.

Step S105: the verification apparatus 1 acquires the communication log associated with the owner identifier from the second storage system 601. Only the communication log of personal data transmission and reception may be acquired.

Step S106: the verification apparatus 1 verifies consistency between the record related to the process including a target record business operator among the records including the record identifier acquired in step S103 and the communication log of personal data transmission and reception. The record business operator as a target may be preliminarily fixed or allowed to be changed by a user input.

In the record-originated verification, it is determined that there is no consistency when the corresponding personal data receipt log does not exist with respect to the receipt record that includes the consent information identifier of the consent to indirect acquirement or the consent to disclosure, in the consent information item. It is determined that there is no consistency when the corresponding personal data transmission log does not exist with respect to the disclosure record that includes the consent information identifier of the consent to indirect acquirement or the consent to disclosure, in the consent information item. It is determined that there is no consistency when the corresponding personal data reception log does not exist with respect to the acquirement record that includes the consent information identifier of the consent to direct acquirement, in the consent information item.

In the log-originated verification, it is determined that there is no consistency when the corresponding disclosure record does not exist with respect to the personal data transmission log.

When there is no consistency with respect to at least one of the record origination and the log origination, the verification apparatus 1 detects inconsistency (determines that there is no consistency).

Hereinafter, an example of the operation of each step is specifically described.

Example 1

Step S101: the verification apparatus 1 receives a consistency verification request for the owner identifier "U000001".

Steps S102 to S104: the description is omitted because these steps are similar to those in the embodiment 1-1.

Step S105: the verification apparatus 1 acquires the communication log associated with the owner identifier "U000001" from the second storage system 601.

FIG. 13 shows an example of a communication log 1-2A.

The verification apparatus 1 acquires logs on the second and third rows in the communication log 1-2A. It is assumed that the record business operator as a target is "C001". The record identifiers "R000002" (receipt record) and "R000004" (generation record) are acquired based on the owner identifier "U000001" and the record business operator "C001". Since "R000004" (generation record) is not related to transmission or reception, "R000004" is not used for verification with the communication log. "R000002" (receipt record) is used for verification with the communication log.

Step S106: the verification apparatus 1 verifies the consistency between the record and the communication log. It is determined that in the record-originated verification, the third row of the communication log corresponds to the record identifier "R000002". In the record-originated verification, inconsistency is not detected. In the log-originated verification, the transmission log of personal data does not exist with respect to the record business operator "C001". In the log-originated verification, inconsistency is not detected. Consequently, the verification apparatus 1 determines that inconsistency between the record related to the process and the communication log is not detected.

Step S107: the description is omitted because this step is similar to that in the embodiment 1-1.

Example 2

Step S101: a case is described where the verification apparatus 1 receives a consistency verification request for the owner identifier "U000002".

Steps S102 to S104: the description is omitted because these steps are similar to those in the embodiment 1-1.

Step S105: the verification apparatus 1 acquires the communication log associated with the owner identifier "U000002" from the second storage system 601. Logs on the first, fourth and fifth rows of the communication log 1-2A in FIG. 13 are acquired. It is assumed that the record business operator as a target is "C001". The record identifiers "R000003" (acquirement record) and "R000005" (deletion record) are acquired based on the owner identifier "U000002" and the record business operator "C001". Since "R000005" (deletion record) is not related to transmission or reception, "R000005" is not used for verification with the communication log.

Step S106: the verification apparatus 1 verifies the consistency between the record and the communication log. It is determined that in the record-originated verification, the fourth row of the communication log corresponds to the record identifier "R000003". In the record-originated verification, inconsistency is not detected. In the log-originated verification, the transmission log of personal data does not exist with respect to the record business operator "C001". In the log-originated verification, inconsistency is not detected. Consequently, the verification apparatus 1 determines that inconsistency between the record related to the process and the communication log is not detected.

Step S107: the description is omitted because this step is similar to that in the embodiment 1-1.

Example 3

Step S101: the verification apparatus 1 receives a consistency verification request.

Steps S102 to S104: the description is omitted because these steps are similar to those in the embodiment 1-1.

Step S105: the verification apparatus 1 acquires a communication log from the second storage system 601. Logs on the first to fifth rows in the communication log 1-2A in FIG. 13 are acquired. It is assumed that the record business operator as a target is "C001". The record identifiers "R000002" (receipt record), "R000003" (acquirement record), "R000004" (generation record) and "R000005" (deletion record) are acquired based on the record business operator "C001", Since "R000004" (generation record) and "R000005" (deletion record) are not related to transmission or reception, they are not used for verification with the communication log.

Step S106: the verification apparatus 1 verifies the consistency between the record and the communication log. In the record-originated verification, the third row of the communication log corresponds to the record identifier "R000002", and the fourth row of the communication log corresponds to the record identifier "R000003". In the record-originated verification, inconsistency is not detected. In the log-originated verification, the transmission log of personal data does not exist with respect to the record business operator "C001". In the log-originated verification, inconsistency is not detected. Consequently, the verification apparatus 1 determines that inconsistency between the record related to the process and the communication log is not detected.

Step S107: the description is omitted because this step is similar to that in the embodiment 1-1.

Example 4

Hereinafter, an example is described where the verification apparatus 1 determines that there is no consistency in verification between the record related to the process and the communication log in step S106. It is assumed that the record business operator as a target is "C001".

It is assumed that the communication log 1-2A in FIG. 13 includes no log on the third row. This case corresponds to a case where in the record-originated verification in step S106, the corresponding receipt log does not exist with respect to the receipt record. The verification apparatus 1 determines that there is no consistency.

Instead of a content item (see FIG. 13) of the communication log, an item of a type discriminating whether reception is that of content from the owner or that of personal data may be used.

FIG. 14 shows an example of a communication log 1-2B that includes the item of the type. In this case, it may be discriminated whether reception is that of consent from the owner or that of personal data, and consistency verification may be performed using simple correspondence between the record and the log. The simple correspondence between the record and the log indicates that the description of identifying each item in the record related to the process (the owner identifier and the record business operator) coincides with the description of identifying each item in the communication log (the transmission party and the reception party).

The communication logs shown in FIGS. 13 and 14 are examples. Another example of a communication log can be adopted. For example, not only the transmission party and the reception party but also an intermediate party between the transmission party and the reception party may be included in the communication log. Alternatively, in a case where a process to be performed after reception exists, the process may be included as the final reception party in the communication log.

Embodiment 1-3

The verification apparatus 1 verifies the consistency between the record related to the consent and the communication log on an owner-by-owner basis. It is assumed that the communication log corresponding to the record related to the consent is held by the process business operator (provider business operator, receiver business operator, and acquirement business operator), or the verification apparatus 1 is accessible.

The verification apparatus 1 performs consistency verification between the record related to the consent and the communication log at the record origination and the log origination. When consent to holding as a precondition is withdrawn, the consent to disclosure is regarded to be unconditionally (automatically) withdrawn. The correspondence between the record and the log indicates that the description of identifying each item in the record related to the consent (consent state etc.) coincides with the description of identifying each item in the communication log, and the date and time identified in the record related to the consent (year, month and day) coincides with the date and time identified in the communication log are close to each other with reference to the threshold. The threshold may be preliminarily fixed, or allowed to be changed by a user input.

Figure 15:
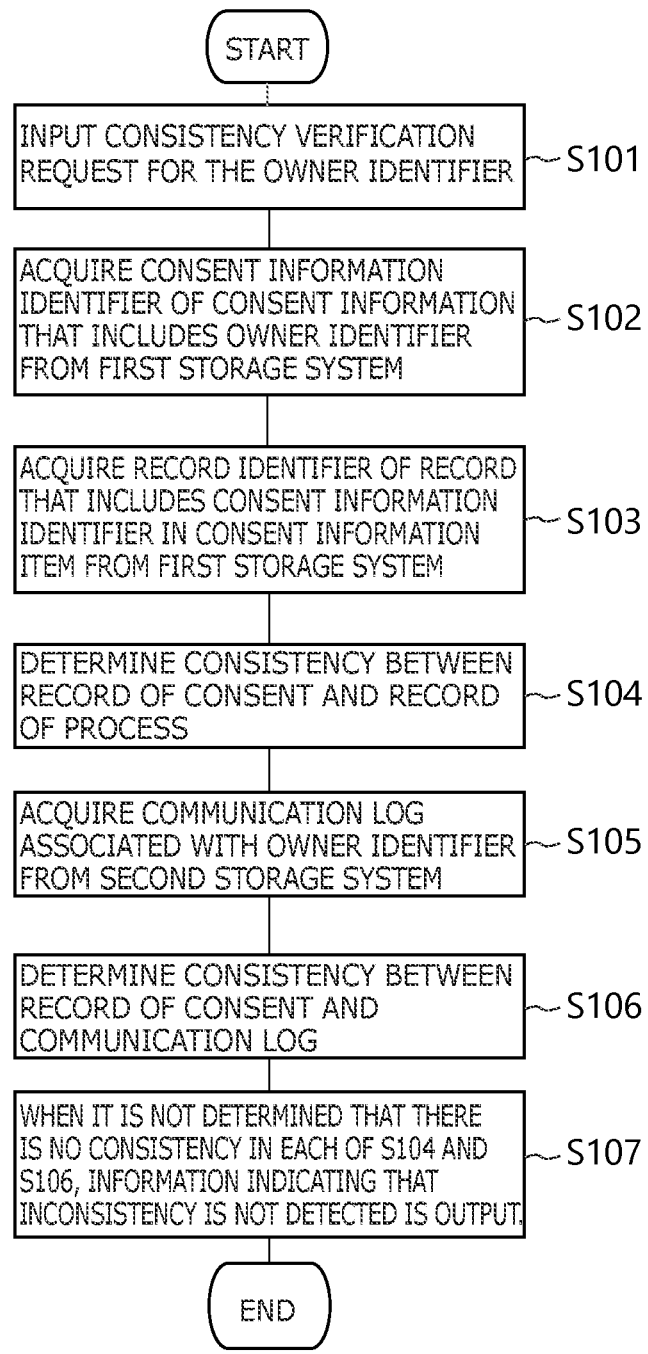
FIG. 15 is a flowchart of an example of operations according to Embodiment 1-3.

FIG. 15 is a flowchart of an example of operations according to Embodiment 1-3. Steps S101 to S104 and S107 are the same as those in FIG. 10 used in the description of the embodiment 1-1.

Step S105: the verification apparatus 1 acquires the communication log associated with the owner identifier from the second storage system 601. Only the communication log of reception of consent by the data owner may be acquired.

Step S106: the verification apparatus 1 verifies the consistency between the consent information including the identifier of the target process business operator (record related to the consent) in the consent information with the consent information identifier acquired in step S102, and the communication log of reception of consent by the owner of data. The target process business operator may be preliminarily fixed or allowed to be changed by a user input.

In the record-originated verification, for consent to indirect acquirement and consent to direct acquirement, it is determined that there is no consistency when the reception log of consent from the corresponding owner does not exist. For consent to disclosure that is not based on the withdrawal of consent to holding, it is determined that there is no consistency when the reception log of consent from the corresponding owner does not exist.

In the log-originated verification, for the reception log of consent from the owner, it is determined that there is no consistency when the corresponding consent to indirect acquirement, consent to direct acquirement, or consent to disclosure (not based on withdrawal of consent to holding) does not exist.

When the verification apparatus 1 determines that there is no consistency with respect to at least one of the record-originated verification and the log-originated verification, inconsistency is detected (it is determined that there is no consistency).

Hereinafter, an example of the operation of each step in the flowchart of FIG. 15 is specifically described. It is assumed that the owner apparatus 501 does not directly access the first storage system 201, but accesses the first storage system 201 via the target process business operator. Thus, the communication log corresponding to the record related to the consent is held by the apparatus of the process business operator, and the reception party that receives consent by the owner is the apparatus of the process business operator.

Example 1

Step S101: the verification apparatus 1 receives a consistency verification request for the owner identifier "U000001".

Steps S102 to S104: the description is omitted because these steps are similar to those in the embodiment 1-1.

Step S105: the verification apparatus 1 acquires the communication log associated with the owner identifier "U000001" from the second storage system 601. The owner identifier or the process business operator is described in each of "TRANSMISSION PARTY" and "RECEPTION PARTY" in the communication log (see FIG. 13). Alternatively, an IP address or the like may be described, and the correspondence between the IP address or the like and the owner identifier or the process business operator may be stored in another table. In a case of reception of content from the owner, the value of each item of the record related to the consent is set in the "CONTENT" item in the communication log. In a case of data transmission and reception as process execution, a combination of the owner identifier, type and details is set. "DATE AND TIME" in the communication log is the date and time of execution of communication, and may have a lower granularity than the date and time of the record related to the process does. Logs on the second and third rows are acquired as logs including owner identifier "U000001" in the "CONTENT" item of the communication log. Based on the "RECEPTION PARTY" item of the acquired log, the process business operator as a target is "C001". The consent information identifier "C000007" (consent to indirect acquirement) of the consent information including the owner identifier "U000001" is acquired.

Step S106: the verification apparatus 1 verifies the consistency between the consent information with the consent information identifier "C000007" (record related to the consent) and the communication log. In the record-originated verification, the second row of the communication log corresponds to the consent information with the consent information identifier "C000007". In the record-originated verification, inconsistency is not detected.

In the log-originated verification, the consent information with the consent information identifier "C000007" corresponds to the second row of the communication log. In the log-originated verification, inconsistency is not detected.

Consequently, the verification apparatus 1 determines that inconsistency between the record related to the consent and the communication log is not detected.

Step S107: the description is omitted because this step is similar to that in the embodiment 1-1.

Example 2

Step S101: the verification apparatus 1 receives a consistency verification request for the owner identifier "U000002".

Steps S102 to S104: the description is omitted because these steps are similar to those in the embodiment 1-1.

Step S105: the verification apparatus 1 acquires the communication log associated with the owner identifier "U000002" from the second storage system 601. Logs on the first, fourth and fifth rows in the communication log in FIG. 13 are acquired. It is assumed that the process business operator as a target is "C001". The consent information identifiers "C000003" and "C000010" (consent to direct acquirement) of the consent information including the owner identifier "U000002" (record related to the consent) are acquired.

Step S106: the verification apparatus 1 verifies the consistency between the consent information with the consent information identifier and the communication log. In the record-originated verification, it is determined that the first row of the communication log corresponds to the consent information with the consent information identifier "C000003", and the fifth row of the communication log corresponds to the consent information with the consent information identifier "C000010". In the record-originated verification, inconsistency is not detected.

In the log-originated verification, it is determined that the consent information with the consent information identifier "C000003" corresponds to the first row of the communication log, and the consent information with the consent information identifier "C000010" corresponds to the fifth row of the communication log. In the log-originated verification, inconsistency is not detected.

Consequently, the verification apparatus 1 determines that inconsistency between the record related to the consent and the communication log is not detected.

Step S107: the description is omitted because this step is similar to that in the embodiment 1-1.

Example 3

Step S101: the verification apparatus 1 receives a consistency verification request.

Steps S102 to S104: the description is omitted because these steps are similar to those in the embodiment 1-1.

Step S105: the verification apparatus 1 acquires a communication log from the second storage system 601. The logs on the first to fifth rows (all logs) in FIG. 13 are acquired. It is assumed that the process business operator as a target is "C001". The consent information identifier "C000003" (consent to direct acquirement), "C000007" (consent to indirect acquirement) and "C000010" (consent to direct acquirement) are acquired as the consent information identifiers of the entire consent information (records related to the consent).

Step S106: the verification apparatus 1 verifies the consistency between the consent information identifier and the communication log. In the record-originated verification, the first row of the communication log corresponds to the consent information identifier "C000003", the second row of the communication log corresponds to the consent information identifier "C000007", and the fifth row of the communication log corresponds to the consent information identifier "C000010". In the record-originated verification, inconsistency is not detected.

In the log-originated verification, it is determined that the consent information with the consent information identifier "C000003" corresponds to the first row of the communication log, the consent information with the consent information identifier "C000007" corresponds to the second row of the communication log, and the consent information with the consent information identifier "C000010" corresponds to the fifth row of the communication log. In the log-originated verification, inconsistency is not detected.

Consequently, the verification apparatus 1 determines that inconsistency between the record related to the consent and the communication log is not detected.

Step S107: the description is omitted because this step is similar to that in the embodiment 1-1.

Example 4

Hereinafter, an example is described where it is determined that there is no consistency in verification between the record related to the consent and the communication log in step S106. It is assumed that the process business operator as a target is "C001".

It is assumed that the communication log in FIG. 13 held in the second storage system 601 includes no second row. This case corresponds to a case with no corresponding reception log with respect to consent to direct acquirement in the record-originated verification in step S106, and it is determined that there is no consistency.

FIG. 16 shows an example of consent information (consent withdrawal information). As for the record related to the consent held in the first storage system 201, it is assumed that consent information with the consent information identifier "C000010" (withdrawal of consent to direct acquirement) does not exist. In this case, in the verification of consistency between the record related to the consent and the record related to the process in step S104, the reception log of nonconsent not based on consent withdrawal exists. Accordingly, it is determined that there is no consistency. Furthermore, in the log-originated verification in step S106, for the reception log of consent from the owner, it is determined that there is no consistency when the corresponding consent to indirect acquirement, consent to direct acquirement, or consent to disclosure not based on withdrawal of consent to holding does not exist.

Even in the case where the communication log includes no content item, it may be discriminated whether reception is that of consent by the owner or that of personal data (see FIG. 14), and consistency verification may be performed using simple correspondence between the record and the log. The simple correspondence between the record and the log indicates that the description of identifying each item in the record related to the consent (the owner identifier and the process business operator) coincides with the description of identifying each item in the communication log (the transmission party and the reception party).

Embodiment 1-4

The verification apparatus 1 verifies the consistency between the record related to consent (consent information) and the authentication log on an owner-by-owner basis. It is assumed that the authentication log corresponding to the record related to the consent is held by the process business operator (provider business operator, receiver business operator, and acquirement business operator), or the verification apparatus 1 can access the authentication log.

When the data owner issues consent to the process to the data management apparatus 101, and the data management apparatus 101 registers the consent information (record related to the consent), based on the consent by the owner, a determination processor 13 of the data management apparatus 101 authenticates the data owner. The authentication method may be any of methods, such as digital certificate authentication, one-time password authentication, and multifactor authentication. The data owner accesses the data management apparatus 101 using the owner apparatus 501, and inputs information required for consent (e.g., the owner identifier, information identifying the content of consent, etc.) and information required for authentication. The determination processor 13 authenticates the data owner, based on the input information, determines registration of the consent information based on the consent when the authentication succeeds, and refuses registration of the consent information when the authentication fails. The result of the authentication process (success or failure) is provided, as an authentication log, for the log holding device 21, and is stored. An authentication device that authenticates the data owner may be provided separately from the determination processor 13.

FIG. 17 shows an example of an authentication log 1-4. The content item of the authentication log includes success in authentication or failure in authentication. "DATE AND TIME" is the date and time of execution of authentication, and may have a lower granularity than the date and time of the record related to the process does. The data "OWNER" is the owner identifier of the owner as an authentication target.

The example of the operation in the embodiment 1-4 is basically similar to that in the embodiment 1-1 (steps S101 to S104 and S107 are similar), but is different in steps S105 and S106.

Verification of consistency between the record related to consent and the authentication log is performed at the record origination. The correspondence between the record and the log indicates that the description of identifying the owner of data in the record related to the consent (owner identifier) coincides with the description of identifying the owner of data in the authentication log, and the date and time (year, month and day) identified in the record related to the consent and the date and time identified in the authentication log are close to each other with reference to the threshold. The threshold may be preliminarily fixed, or allowed to be changed by a user input.

Step S105: the verification apparatus 1 acquires the authentication log associated with the owner identifier from the second storage system 601. Only the authentication log of the owner may be acquired.

Step S106: the verification apparatus 1 verifies the consistency between the record related to the consent including the identifier of the target process business operator among records related to the consent (consent information) including the consent information identifier acquired in step S102, and the authentication log of the owner. The target process business operator may be preliminarily fixed or allowed to be changed by a user input.

In the record-originated verification, for consent to indirect acquirement and consent to direct acquirement, the verification apparatus 1 determines that there is no consistency when the authentication success log by the corresponding owner does not exist. For consent to disclosure that is not based on the withdrawal of consent to holding, the verification apparatus 1 determines that there is no consistency when the authentication success log by the corresponding owner does not exist.

Hereinafter, an example of the operation of each step is specifically described. It is assumed that the owner apparatus 501 does not directly access the first storage system 201, but accesses the first storage system 201 via an apparatus of the target process business operator (e.g., the data management apparatus 101, the second storage system 601, the data transmitter apparatus 301, and the data receiver apparatus 401). Consequently, the authentication log of the owner is held in the apparatus of the process business operator.

Example 1

Step S101: the verification apparatus 1 receives a consistency verification request for the owner identifier "U000001".

Steps S102 to S104: the description is omitted because these steps are similar to those in the embodiment 1-1.

Step S105: the verification apparatus 1 acquires the authentication log associated with the owner identifier "U000001" from the second storage system 601. A log on the second row of the authentication log in FIG. 17 is acquired. It is assumed that the process business operator as a target is "C001". Based on the owner identifier "U000001" and the process business operator "C001", the consent information identifier "C000007" (consent to indirect acquirement) is acquired.

Step S106: the verification apparatus 1 verifies the consistency between the consent information with the consent information identifier and the authentication log. In the record-originated verification, the second row of the authentication log corresponds to the consent information with the consent information identifier "C000007". In the record-originated verification, inconsistency is not detected. Consequently, the verification apparatus 1 determines that inconsistency between the record related to the consent and the authentication log is not detected.

Step S107: the description is omitted because this step is similar to that in the embodiment 1-1.

Example 2

Step S101: the verification apparatus 1 receives a consistency verification request for the owner identifier "U000002".

Steps S102 to S104: the description is omitted because these steps are similar to those in the embodiment 1-1.

Step S105: the verification apparatus 1 acquires the authentication log associated with the owner identifier "U000002" from the second storage system 601. Logs on the first and third rows of the authentication log in FIG. 17 are acquired. It is assumed that the process business operator as a target is "C001". Based on the owner identifier "U000002" and the process business operator "C001", the consent information identifiers "C000003" and "C000010" (consent to direct acquirement) are acquired.

Step S106: the verification apparatus 1 verifies the consistency between the consent information with the consent information identifier and the authentication log. In the record-originated verification, the first row of the authentication log corresponds to the consent information identifier "C000003", and the third row of the authentication log corresponds to the consent information identifier "C000010". In the record-originated verification, inconsistency is not detected. Consequently, the verification apparatus 1 determines that inconsistency between the record related to the consent and the authentication log is not detected.

Step S107: the description is omitted because this step is similar to that in the embodiment 1-1.

Example 3

Step S101: the verification apparatus 1 receives a consistency verification request.

Steps S102 to S104: the description is omitted because these steps are similar to those in the embodiment 1-1.

Step S105: the verification apparatus 1 acquires the authentication log of the owner from the second storage system 601. The logs on the first to third rows (all logs) in FIG. 17 are acquired. It is assumed that the process business operator as a target is "C001". The consent information identifier "C000003" (consent to direct acquirement), "C000007" (consent to indirect acquirement) and "C000010" (consent to direct acquirement) are acquired as the consent information identifiers of the entire consent information.

Step S106: the verification apparatus 1 verifies the consistency between the consent information with the consent information identifier and the authentication log. In the record-originated verification, the first row of the authentication log corresponds to the consent information identifier "C000003", the second row of the authentication log corresponds to the consent information identifier "C000007", and the fifth row of the authentication log corresponds to the consent information identifier "C000010". In the record-originated verification, inconsistency is not detected. Consequently, the verification apparatus 1 determines that inconsistency between the record related to the consent and the authentication log is not detected.

Step S107: the description is omitted because this step is similar to that in the embodiment 1-1.

Example 4

Hereinafter, an example is described where it is determined that there is no consistency in verification between the record related to the consent and the authentication log in step S106. It is assumed that the process business operator as a target is "C001".

It is assumed that in the example of the authentication log in FIG. 17 held in the second storage system 601, the log on the second row does not exist, or the value of the content item is failure in authentication. This case corresponds to a case with no corresponding authentication success log with respect to consent to indirect acquirement in the record-originated verification in step S106, and it is determined that there is no consistency.

Second Embodiment

Embodiment 2-1

Figure 18:
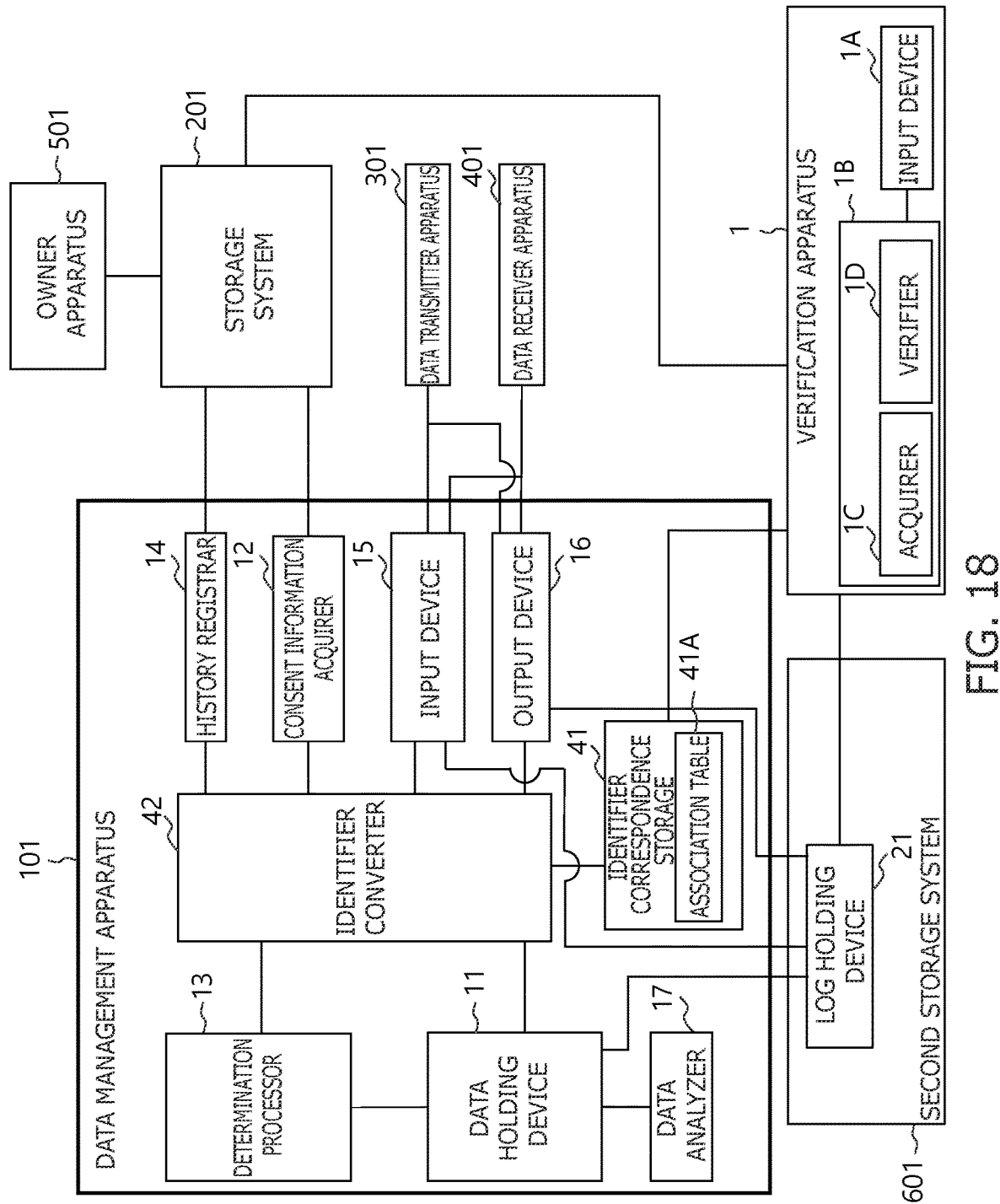
FIG. 18 is an overall configuration diagram of a data management system according to a second embodiment.

FIG. 18 is an overall configuration diagram of a data management system that is an information processing system according to a second embodiment. The data management apparatus 101 further includes an identifier correspondence storage 41, and an identifier converter 42. The same elements as those in the first embodiment are assigned the same signs and the description is appropriately omitted.

In the second embodiment, for a certain identical data owner (person), the data management apparatus 101, the first storage system 201, the data transmitter apparatus 301, and the data receiver apparatus 401 use owner identifiers different from each other.

The identifier correspondence storage 41 stores an association table 41A between the owner identifiers of the apparatuses (101, 201, 301 and 401). The association table 41A is stored by the administrator or the like of the data management apparatus 101.

FIG. 19 shows an example of the association table 41A. For example, an owner identifier 1 is an identifier used for managing (identifying) the owner in the first storage system 201. An owner identifier 2 is an identifier used for managing the owner in the data management apparatus 101. An owner identifier 3 is an identifier used for managing the owner in the data transmitter apparatus 301. An owner identifier 4 is an identifier used for managing the owner in the data receiver apparatus 401. In a case where the owner identifiers are common to multiple apparatuses, the association table 41A may be an association table of owner identifiers of two or three types instead of four types. For example, the association table 41A may be that of the owner identifier 2 and the owner identifier 3. An association table 41A may be generated by associating the preliminarily acquired owner identifier with the newly acquired owner identifier.

The identifier converter 42 receives information including the owner identifier to be converted (convert target information), and information on an output destination (output destination information) of information including the converted owner identifier. The identifier converter 42 acquires the corresponding owner identifier "j" (j=1, ..., 4, j≠i), from the owner identifiers "i" (i=1, ..., 4) included in the convert target information, on the basis of the association table 41A, The identifier converter 42 generates, as converted information, information where the owner identifier "i" of the convert target information is replaced with an owner identifier "j". The owner identifier "i" included in the convert target information is thus converted into the owner identifier "j". The identifier converter 42 outputs the converted information that includes the converted owner identifier "j", to the output destination indicated by the output destination information.

The operation of the data management apparatus 101 in the second embodiment is different from that in the first embodiment in that a process of converting the owner identifier by the identifier converter 42 upon occurrence of exchange between the apparatuses dealing with different owner identifiers is added. In a case where the owner identifier is common to some of the apparatuses, the process of converting the owner identifier by the identifier converter 42 is not required for the exchange between the apparatuses having the common owner identifier.

By adding the identifier correspondence storage 41 and the identifier converter 42 as described above, the consent can be verified and recorded even using owner identifiers different among systems and apparatuses.

The owner identifier (owner identifier 2) used in the data holding device 11 may be a pseudonym. Pseudonyms are, for example, character strings which are random and do not overlap each other. The person cannot be identified only with the pseudonym. However, through use of the association table 41A, the person can be identified.

FIG. 20 shows an example of the association table 41A where the owner identifier 2 is a pseudonym. Owner identifiers other than the owner identifier 2 may be pseudonyms. Multiple identifiers among the owner identifiers 1 to 4 may be pseudonyms. By using the pseudonym, data can be stored with the pseudonym, and the privacy of people can be protected.

The verification apparatus 1 accesses the association table 41A, and verifies the consistency between the record related to the process and the data access log on an owner-by-owner basis. Hereinafter, referring to FIG. 21, the operations of the verification apparatus 1 are described.

Figure 21:
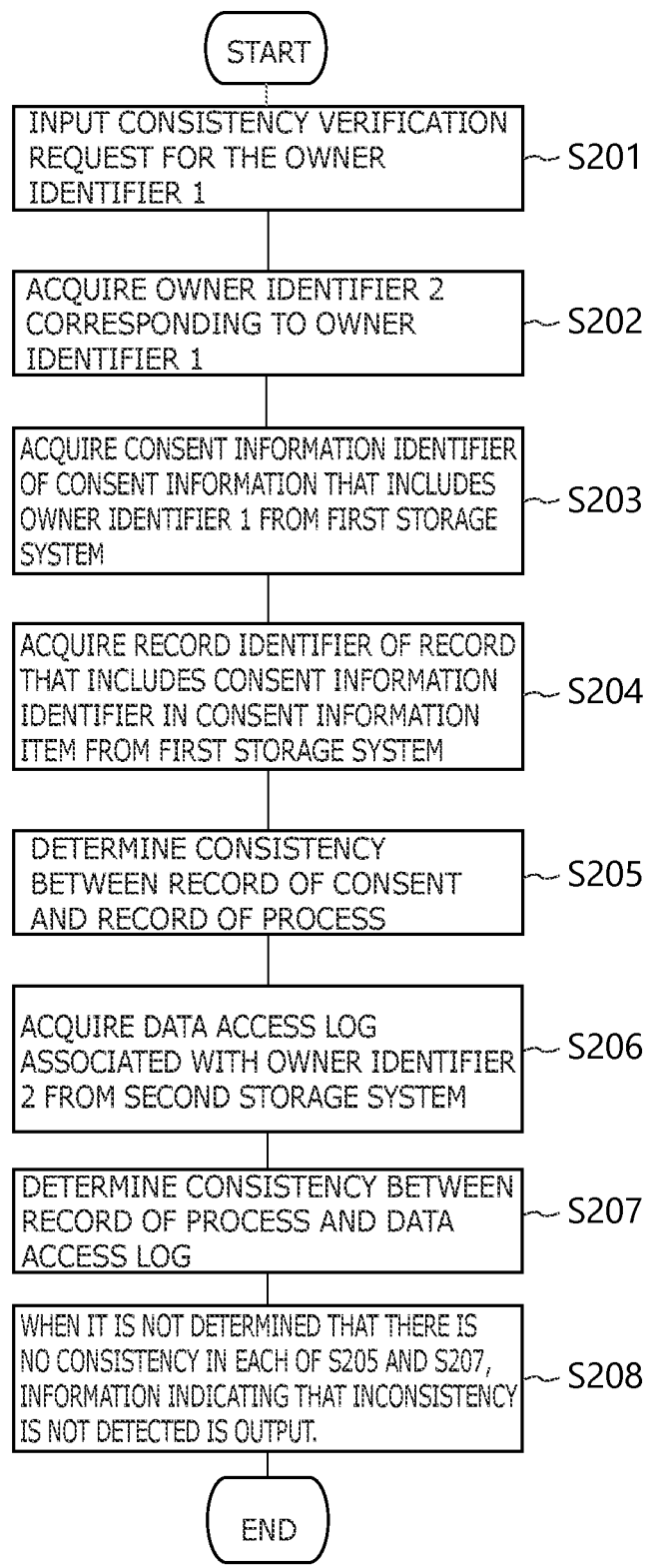
FIG. 21 is a flowchart of an example of operations of a verification apparatus according to the second embodiment.

FIG. 21 is a flowchart of an example of operations of the verification apparatus 1 according to the second embodiment.

Step S201: the verification apparatus 1 receives a consistency verification request for the owner identifier 1 (or 2).

step S202: the verification apparatus 1 acquires the owner identifier 2 (or 1) corresponding to the owner identifier 1 (or 2), from the association table 41A.

Step S203: the verification apparatus 1 acquires the consent information identifier of consent information that includes the owner identifier 1, from the first storage system 201.

Step S204: the verification apparatus 1 acquires the record identifier of the record that includes the consent information identifier in the consent information item, from the first storage system 201. When the owner identifier 1 is included in the record related to the process, the record identifier of the record that includes the owner identifier may be acquired from the first storage system 201.

Step S205: the verification apparatus 1 verifies the consistency between the record related to the consent (consent information) and the record related to the process.

Correspondence between the record and the log indicates that a description of identifying data (the owner identifier 1) in a record related to consent referred to by the record related to the process corresponds to the description of identifying data (owner identifier 2) in the data access log. This corresponds to the case of coincidence between the owner identifiers in the first embodiment.

Step S206: the verification apparatus 1 acquires the data access log associated with the owner identifier 2 from the second storage system 601.

Step S207: the verification apparatus 1 verifies consistency between the record related to the process including a target record business operator among the records including the record identifier acquired in step S204 and the acquired data access log.

Step S208: when the verification apparatus 1 determines that there is no consistency with respect to at least one of the record-originated verification and the log-originated verification, this apparatus outputs information indicating that inconsistency is detected (without consistency).

Hereinafter, an example of the operation of each step is specifically described. It is assumed that the owner identifier 2 is a pseudonym. It is assumed that the real name corresponding to the owner identifier 2 is used in the data management apparatus, and the owner identifier 2 (pseudonym) is used in the data holding device 11.

Example 1

Step S201: the verification apparatus 1 receives a consistency verification request for the owner identifier 1 ("U000001").

Step S202: the verification apparatus 1 acquires the owner identifier 2 ("DKGLANCK") corresponding to the owner identifier 1 ("U000001"), from the association table 41A.

Steps S203 to S205: the description is omitted because these steps are similar to steps S102 to S104 in the embodiment 1-1.

Step S206: the verification apparatus 1 acquires the data access log associated with the owner identifier 2 ("DKGLANCK") from the second storage system 601.

FIG. 22 shows an example of a data access log 2-1. The verification apparatus 1 acquires logs on the first, third and fourth rows of the data access log in FIG. 22.

It is assumed that the record business operator as a target is "C001". The verification apparatus 1 acquires the record identifiers "R000002" (receipt record) and "R000004" (generation record), based on the record business operator "C001" and the owner identifier 1 "U000001".

Step S207: the verification apparatus 1 verifies the consistency between the record and the data access log. In the record-originated verification, the first row of the data access log corresponds to the record with the record identifier "R000002", and the third and fourth rows of the data access log correspond to records with the record identifier "R000004". In the record-originated verification, inconsistency is not detected.

In the log-originated verification, it is determined that the record with the record identifier "R000002" corresponds to the first row of the data access log, and the record with the record identifier "R000004" corresponds to the fourth row of the data access log. In the log-originated verification, inconsistency is not detected.

Consequently, the verification apparatus 1 determines that inconsistency between the record related to the process and the data access log is not detected.

Step S208: the description is omitted because this step is similar to step S107 in the embodiment 1-1.

Example 2

Step S201: the verification apparatus 1 receives a consistency verification request for the owner identifier 1 ("U000002").

Step S202: the verification apparatus 1 acquires the owner identifier 2 ("PEQZLFMA") corresponding to the owner identifier 1 ("U000002"), from the association table 41A.

Steps S203 to S205: the description is omitted because these steps are similar to steps S102 to S104 in the embodiment 1-1.

Step S206: the verification apparatus 1 acquires the access log associated with the owner identifier 2 ("PEQZLFMA") from the second storage system 601. The verification apparatus 1 acquires logs on the second and fifth rows of the data access log in FIG. 22.

It is assumed that the record business operator as a target is "C001". The verification apparatus 1 acquires the record identifiers "R000003" (acquirement record) and "R000005" (generation record), based on the record business operator "C001" and the owner identifier 1 ("U000002").

Step S207: the verification apparatus 1 verifies the consistency between the record and the data access log. In the record-originated verification, the second row of the data access log corresponds to the record with the record identifier "R000002", and the fifth row of the data access log corresponds to the record with the record identifier "R000005". In the record-originated verification, inconsistency is not detected.

In the log-originated verification, the record with the record identifier "R000003" corresponds to the second row of the data access log, and the record with the record identifier "R000005" corresponds to the fifth row of the data access log. In the log-originated verification, inconsistency is not detected.

Consequently, the verification apparatus 1 determines that inconsistency between the record related to the process and the data access log is not detected.

Step S208: the description is omitted because this step is similar to that in the embodiment 1-1.

Example 3

A modified example where a function is added to improve the reliability is described. A hash value of correspondence of the owner identifier to be used is added as an item to each of the disclosure record, the receipt record, and the acquirement record. In steps S203 to S205, the verification apparatus 1 may calculate the hash value of the correspondence of the owner identifier held in the identifier correspondence storage 41, compare the calculated hash value with the hash value of the item in the record, and determine that there is no consistency when the comparison is inconsistent.

Multiple types of owner identifiers 2 may be used. In this case, multiple types of owner identifiers 2 described in the access destination of the data access log may be included.

Embodiment 2-2

The verification apparatus 1 accesses the association table 41A, and verifies the consistency between the record related to the process and the communication log on an owner-by-owner basis. As for the steps of operations of the verification apparatus 1 in the embodiment 2-2, steps S203 to S205 and S208 in the embodiment 2-1 similarly apply to the embodiment 2-2. Operations corresponding to steps S201, S202, S206 and S207 are different from those in the embodiment 2-1.

Correspondence between the record and the log indicates that the description of identifying data in a record related to process (the owner identifier 1) corresponds to the description (owner identifier "i", i=1, ..., 4) of identifying data in the communication log. This corresponds to the case of coincidence between the owner identifiers in the first embodiment.

Steps S201 and S202: the verification apparatus 1 receives a consistency verification request for the owner identifier "i" (i=1, . . . , 4). The verification apparatus 1 acquires the owner identifier "j" (j=1, . . . , 4, j≠i) corresponding to the owner identifier "i" (i=1, . . . , 4) from the association table 41A.

Step S206: the verification apparatus 1 acquires the communication log associated with the owner identifier "i" (i=1, . . . , 4) from the second storage system 601.

Step S207: the verification apparatus 1 verifies consistency between the record related to the process including a target record business operator among the records including the record identifier acquired in step S204 and the communication log. When it is determined that there is no consistency with respect to at least one of the record-originated verification and the log-originated verification, inconsistency is detected (it is determined that there is no consistency).

Hereinafter, an example of the operation of each step is specifically described. It is assumed that the owner identifier 2 is a real name. It is assumed that the owner identifier 2 (real name) is used in the data management apparatus, and the pseudonym corresponding to the owner identifier 2 is used in the data holding device 11.

Example 1

Steps S201 and S202: the verification apparatus 1 receives a consistency verification request for the owner identifier 2 ("V000001"). The verification apparatus 1 acquires the owner identifier 1 ("U000001") and the owner identifier 3 ("Username1") corresponding to the owner identifier 2 ("V000001") from the association table 41A.

Steps S203 to S205: the description is omitted because these steps are similar to those in the embodiment 1-1.

Step S206: the verification apparatus 1 acquires the communication log associated with the owner identifier 2 ("V000001") and the owner identifier 3 ("Username1") from the second storage system 601.

FIG. 23 shows an example of a communication log 2-2. The verification apparatus 1 acquires logs on the second and third rows in the communication log in FIG. 23. It is assumed that the record business operator as a target is "C001". The record identifiers "R000002" (receipt record) and "R000004" (generation record) are acquired based on the record business operator "C001" and the owner identifier 1 ("U000001"). Since "R000004" (generation record) is not related to transmission or reception, "R000004" is not used for verification with the communication log. "R000002" (receipt record) is used for verification with the communication log.

Step S207: the verification apparatus 1 verifies the consistency between the record and the communication log. It is determined that in the record-originated verification, the third row of the communication log corresponds to the record with the record identifier "R000002". In the record-originated verification, inconsistency is not detected.

In the log-originated verification, the transmission log of personal data does not exist. In the log-originated verification, inconsistency is not detected.

Consequently, the verification apparatus 1 determines that inconsistency between the record related to the process and the communication log is not detected.

Step S208: the description is omitted because this step is similar to that in the embodiment 1-1.

Example 2

Steps S201 and S202: the verification apparatus 1 receives a consistency verification request for the owner identifier 2 ("V000002"). The verification apparatus 1 acquires the owner identifier 1 ("U000002") and the owner identifier 3 ("Username2") corresponding to the owner identifier 2 ("V000002") from the association table 41A.

Steps S203 to S205: the description is omitted because these steps are similar to those in the embodiment 1-1.

Step S206: the verification apparatus 1 acquires the communication log associated with the owner identifier 2 ("V000002") and the owner identifier 3 ("Username2") from the second storage system 601. Logs on the first, fourth and fifth rows in the communication log in FIG. 23 are acquired.

It is assumed that the record business operator as a target is "C001". The record identifiers "R000003" (acquirement record) and "R000005" (deletion record) are acquired based on the record business operator "C001" and the owner identifier 1 ("U000002"). Since "R000005" (deletion record) is not related to transmission or reception, "R000005" is not used for verification with the communication log. "R000003" (acquirement record) is used for verification with the communication log.

Step S207: the verification apparatus 1 verifies the consistency between the record and the communication log. In the record-originated verification, the fourth row of the communication log corresponds to the record with the record identifier "R000003". In the record-originated verification, inconsistency is not detected.

In the log-originated verification, the transmission log of personal data does not exist. In the log-originated verification, inconsistency is not detected.

Consequently, the verification apparatus 1 determines that inconsistency between the record related to the process and the communication log is not detected.

Step S208: the description is omitted because this step is similar to that in the embodiment 1-1.

The communication log shown in FIG. 23 is examples. Another example of a communication log can be adopted. For example, the owner identifier described in each of the items of the transmission party, the reception party and the content may be a pseudonym. Multiple types of owner identifiers 3 that are identifiers used to manage owners in the data transmitter apparatus 301 may be used with respect to each data transmitter. Multiple types of owner identifiers 4 that are identifiers used to manage owners in the data receiver apparatus 401 may be used with respect to each data receiver.

Embodiment 2-3

The verification apparatus 1 accesses the association table 41A, and verifies the consistency between the record related to the consent (consent information) and the communication log on an owner-by-owner basis. As for the steps of operations of the verification apparatus in the embodiment 2-3, steps S203 to S205 and S208 in the embodiment 2-1 similarly apply to the embodiment 2-3, and steps S201 and S202 in the embodiment 2-2 similarly apply to the embodiment 2-3. Operations corresponding to steps S206 and S207 are different from those in the embodiments 2-1 and 2-2.

Correspondence between the record and the log indicates that the description of identifying data in a record related to consent (the owner identifier 1) corresponds to the description (owner identifier "i", i=1, . . . , 4) of identifying data in the communication log. This corresponds to the case of coincidence between the owner identifiers in the embodiment 1.

Step S206: the verification apparatus 1 acquires the communication log associated with the owner identifier "i" (i=1, . . . , 4) from the second storage system 601.

Step S207: the verification apparatus 1 verifies the consistency between the consent information (record related to consent) including the target process business operator in the consent information with the consent information identifier acquired in step S203, and the communication log. When the verification apparatus 1 determines that there is no consistency with respect to at least one of the record-originated verification and the log-originated verification, inconsistency is detected (it is determined that there is no consistency).

Hereinafter, an example of the operation of each step is specifically described.

Example 1

Step S201: the verification apparatus 1 receives a consistency verification request for the owner identifier 2 ("V000001").

Step S202: the description is omitted because this step is similar to that in the embodiment 2-2.

Steps S203 to S205: the description is omitted because these steps are similar to those in the embodiment 1-1.

Step S206: the verification apparatus 1 acquires the log associated with the owner identifier 2 ("V000001") and the owner identifier 3 ("Username1") from the communication log in the second storage system 601. Logs on the second and third rows in the communication log in FIG. 23 are acquired.

It is assumed that the process business operator as a target is "C001". Based on the process business operator "C001" and the owner identifier ("U000001"), the consent information identifier "C000007" (consent to indirect acquisition) is acquired.

Step S207: the verification apparatus 1 verifies the consistency between the consent information (record related to the consent) with the consent information identifier and the communication log. In the record-originated verification, it is determined that the consent information with the consent information identifier "C000007" corresponds to the second row of the communication log. In the record-originated verification, inconsistency is not detected.

In the log-originated verification, the consent information with the consent information identifier "C000007" corresponds to the second row of the communication log. In the log-originated verification, inconsistency is not detected.

Consequently, the verification apparatus 1 determines that inconsistency between the record related to the consent and the communication log is not detected.

Step S208: the description is omitted because this step is similar to that in the embodiment 1-1.

Example 2

Step S201: the verification apparatus 1 receives a consistency verification request for the owner identifier 2 ("V000002").

Step S202: the description is omitted because this step is similar to that in the embodiment 2-2.

Steps S203 to S205: the description is omitted because these steps are similar to those in the embodiment 1-1.

Step S206: the verification apparatus 1 acquires the communication log associated with the owner identifier 2 ("V000002") and the owner identifier 3 ("Username2") from the communication log in the second storage system 601. Logs on the first, fourth and third rows in the communication log in FIG. 23 are acquired.

It is assumed that the process business operator as a target is "C001". Based on the process business operator "C001" and the owner identifier 2 ("U000002"), the consent information identifiers "C000003" and "C000010" (consent to direct acquirement) are acquired.

Step S207: the verification apparatus 1 verifies the consistency between the consent information (record related to the consent) with the consent information identifier and the communication log. In the record-originated verification, the first row of the communication log corresponds to the consent information with the consent information identifier "C000003", and the fifth row of the communication log corresponds to the consent information with the consent information identifier "C000010". In the record-originated verification, inconsistency is not detected.

In the log-originated verification, the consent information with the consent information identifier "C000003" corresponds to the first row of the communication log, and the consent information with the consent information identifier "C000010" corresponds to the fifth row of the communication log. In the log-originated verification, inconsistency is not detected.

Consequently, the verification apparatus 1 determines that inconsistency between the record related to the process and the communication log is not detected.

Step S208: the description is omitted because this step is similar to that in the embodiment 1-1.

Third Embodiment

Embodiment 3-1

Figure 24:
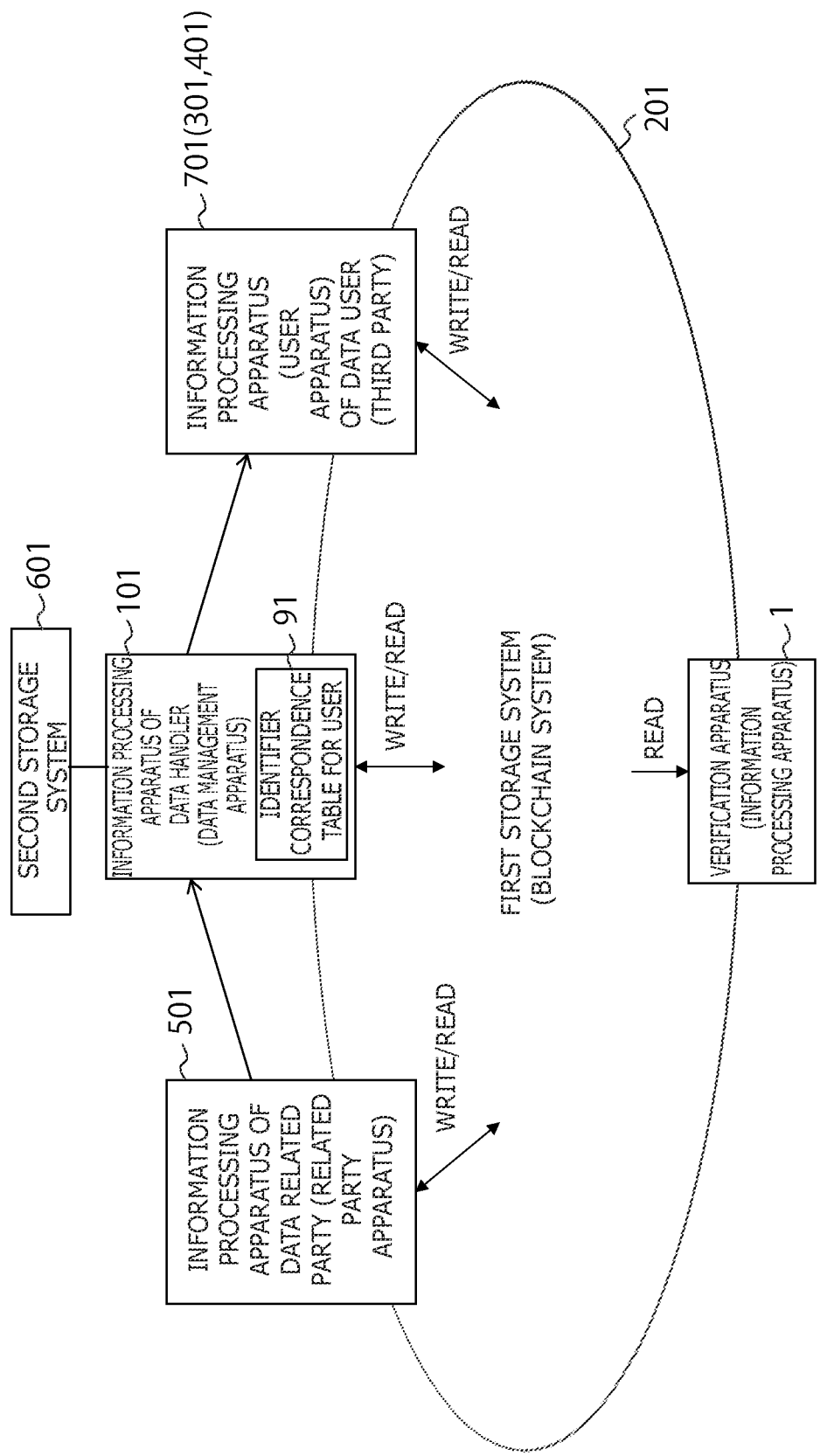
FIG. 24 is a block diagram showing an example of a data management system according to a third embodiment.

FIG. 24 is a block diagram showing an example of a data management system that is an information processing system according to one embodiment of the present invention. Elements identical or corresponding to those in FIG. 1 are assigned the same signs, and description is appropriately omitted. The information processing system according to this embodiment includes: a related party apparatus 501 (corresponds to the owner apparatus 501 in FIG. 1) that is an information processing apparatus of a data related party (e.g., a data owner); a data management apparatus 101 that is an information processing apparatus of a data handler; a user apparatus 701 that is an information processing apparatus of a data user that is a third party and is not the data related party or the data handler; a first storage system 201 (a blockchain system in this example); and a verification apparatus 1. The verification apparatus 1 is an information processing apparatus that performs verification pertaining to various records written in the blockchain system 201. FIG. 1 shows that the verification apparatus 1 is the apparatus different from the related party apparatus 501, the data management apparatus 101 and the user apparatus 701. However, the verification apparatus 1 may be the same apparatus as at least one of the related party apparatus 501, the data management apparatus 101 and the user apparatus 701. The data management apparatus 101 is connected to the second storage system 601. The data management apparatus 101 includes an identifier correspondence table 91 for users (hereinafter, an association table 91). The association table 91 is stored in the data holding device or another storage. The block configurations of the verification apparatus 1, the data management apparatus 101 and the second storage system 601 are the same as those in FIG. 1.

Note that each of the numbers of related party apparatuses 501 and user apparatuses 701 are not limited to one, and may be plural. The user apparatus 701 corresponds to the data transmitter apparatus 301 or the receiver apparatus 401 in FIG. 1, for example. Note that a case where the user apparatus 701 is the data management apparatus 101 may also be adopted.

According to the information processing system of this embodiment, the data management apparatus 101 handles data of the data related party (data owner). Various types of handling are assumed. According to one of the types of handling, the data management apparatus 101 can transmit the data to the user apparatus 701. In other words, the data handler can provide data of the data related party for the data user that is a third party. For example, it is so conceivable that a personal information handling business operator (PDS business operator) operating a PDS (Personal Data Store) storing personal data is a data handler, and the PDS business operator acquires consent of the principal or an agent and then provides the personal data for a third party. Note that in a case where the data handler does not collect data by themself, acquires data from a data related party, and provides the data for the data user, the data handler is a primary receiver of the data, and the data user is a secondary receiver of the data.

Note that the data related party, the data handler, and the data user are not limited to a specific party, and may be a person or a corporate body. The data related party simply means a party to be associated with the data, and is not limited to a specific party. For example, the data related party may be a party that consents to data handling by the data handler, a data holder, or an agent of the holder. The data related party may be a person identified by the data. For example, the data may indicate the address, gender, age and the like. A person identified by the address and the like may be regarded as a data related party. As described above, a party related to consent on the data or a party related to the data itself is assumed as a data related party.

The type of data to be dealt with or the method of transmitting and receiving the data in this embodiment is not limited to a specific type or method. For example, the data as a target may be personal data, or industrial data.

In this embodiment, the record related to the data is written in a blockchain provided by the blockchain system 201. A fact that consent on data-handling is achieved, a fact that the handling is executed, and a fact that the data becomes usable by the fact that the handling is executed, and the like are written in the blockchain. For example, a fact that the data is provided for a third party, or a fact that the data is acquired, received, analyzed, edited or deleted may be written in the blockchain. In this embodiment, acquirement of the data means that the data handler acquires the data from the data related party, and receipt of the data means that the data is acquired from the data handler. Note that acquirement and receipt may be integrated into any one of them.

By leaving such a record related to the data, the traceability of the data can be secured. For example, when the data is provided for the third party, the data related party is allowed to verify which user the data has been provided, and consent as a basis of disclosure. Management of the records by the blockchain can improve resistance to falsification of the records.

The blockchain is managed in information processing apparatuses belonging to a P2P network pertaining to the blockchain in a distributed manner. The P2P network can also be regarded as a network for forming a consensus for content to be written in a block of the blockchain. The related party apparatus 501, the data management apparatus 101, and the user apparatus 701 may be allowed to write records related to the data to the blockchain directly or indirectly, That is, the related party apparatus 501, the data management apparatus 101, and the user apparatus 701 may belong to the blockchain system 201, in other words, the P2P network pertaining to the blockchain, and perform writing directly in a block of the blockchain. Alternatively, the related party apparatus 501, the data management apparatus 101, and the user apparatus 701 may be allowed not to belong to the blockchain system 201, and may request an information processing apparatus belonging to the blockchain system 201 to perform writing to the blockchain. In other words, by transmitting a record intended to be written to the information processing apparatus belonging to the blockchain, writing to the blockchain can be indirectly achieved.

The related party apparatus 501, the data management apparatus 101 and the user apparatus 701 may separately perform writing in the block of the blockchain. Alternatively, any of the apparatuses may serve as a representative and perform writing. For example, the related party apparatus 501 may write the record related to the consent in a block of the blockchain, and the data management apparatus 101 may recognize the consent by monitoring the blockchain. Alternatively, the data management apparatus 101 may acquire information indicating consent by the related party apparatus 501, via a medium other than the blockchain, such as email or a web page, and write a record related to the consent in a block of the blockchain, based on the information.

Note that a publicly known technique may be used as the method of writing in the blockchain, and is not described in detail in this embodiment. For example, to represent safety, a digital signature may be attached to a record to be written. The digital signature may be generated from a private key of the related party apparatus 501, or generated from a private key of the data management apparatus 101. It is relatively difficult for the data related party to safely manage the private key. Accordingly, management of the private key is delegated to the data handler in some cases. Thus, on behalf of the related party apparatus 501, the data management apparatus 101 may generate a digital signature from the private key of the related party apparatus 501, and transmit the signature to the related party apparatus 501.

The verification apparatus 1 receives, from another apparatus, a verification request for consistency with any record written in the blockchain, retrieves a record from the blockchain, based on the verification request, and verifies the consistency of the record. The requester apparatus of the verification request may be the related party apparatus 501, the data management apparatus 101 or the user apparatus 701, or an apparatus other than these apparatuses. The verification apparatus 1 may be allowed not to belong to the blockchain system 201, and may request an information processing apparatus belonging to the blockchain system 201 to search the blockchain. FIG. 24 shows that the verification apparatus 1 is the apparatus different from the related party apparatus 501, the data management apparatus 101 and the user apparatus 701. However, at least any one of the related party apparatus 501, the data management apparatus 101 and the user apparatus 701 serves also as the verification apparatus 1.

Note that the subject related to the information processing system is not limited to the subject shown in FIG. 24. Another subject may exist. For example, it is also assumed that the related party's data is held by a data manager other than the data handler. In this case, an information processing apparatus of the data manager may acquire data from the related party apparatus 501, and the information processing apparatus of the data manager may receive an instruction from the data management apparatus 101, and transmit the data to the user apparatus 701. That is, the information processing apparatus of the data manager may function as part of the data management apparatus 101.

Figure 25:
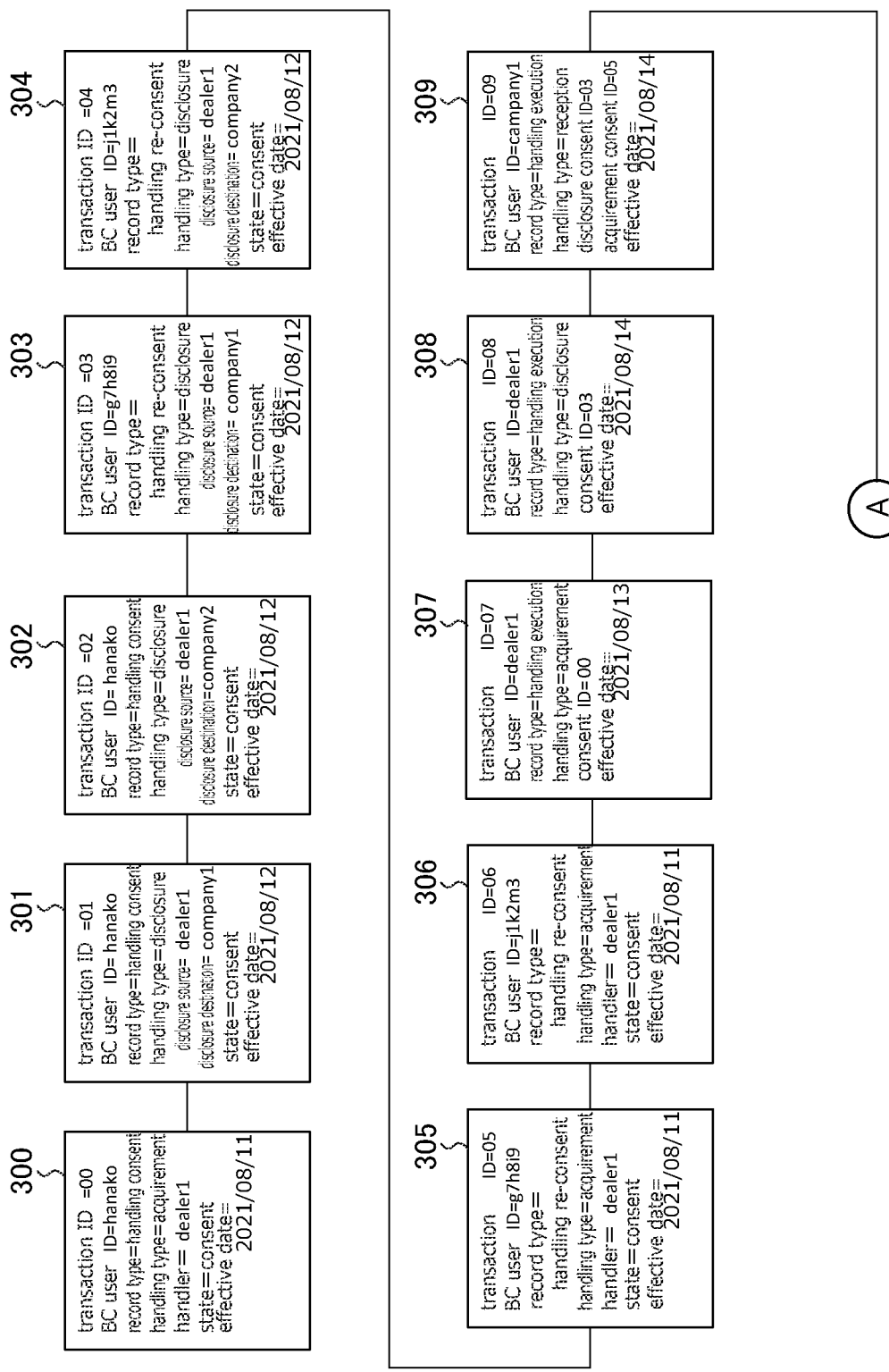
FIG. 25 shows an example of a blockchain according to the third embodiment.
Figure 26:
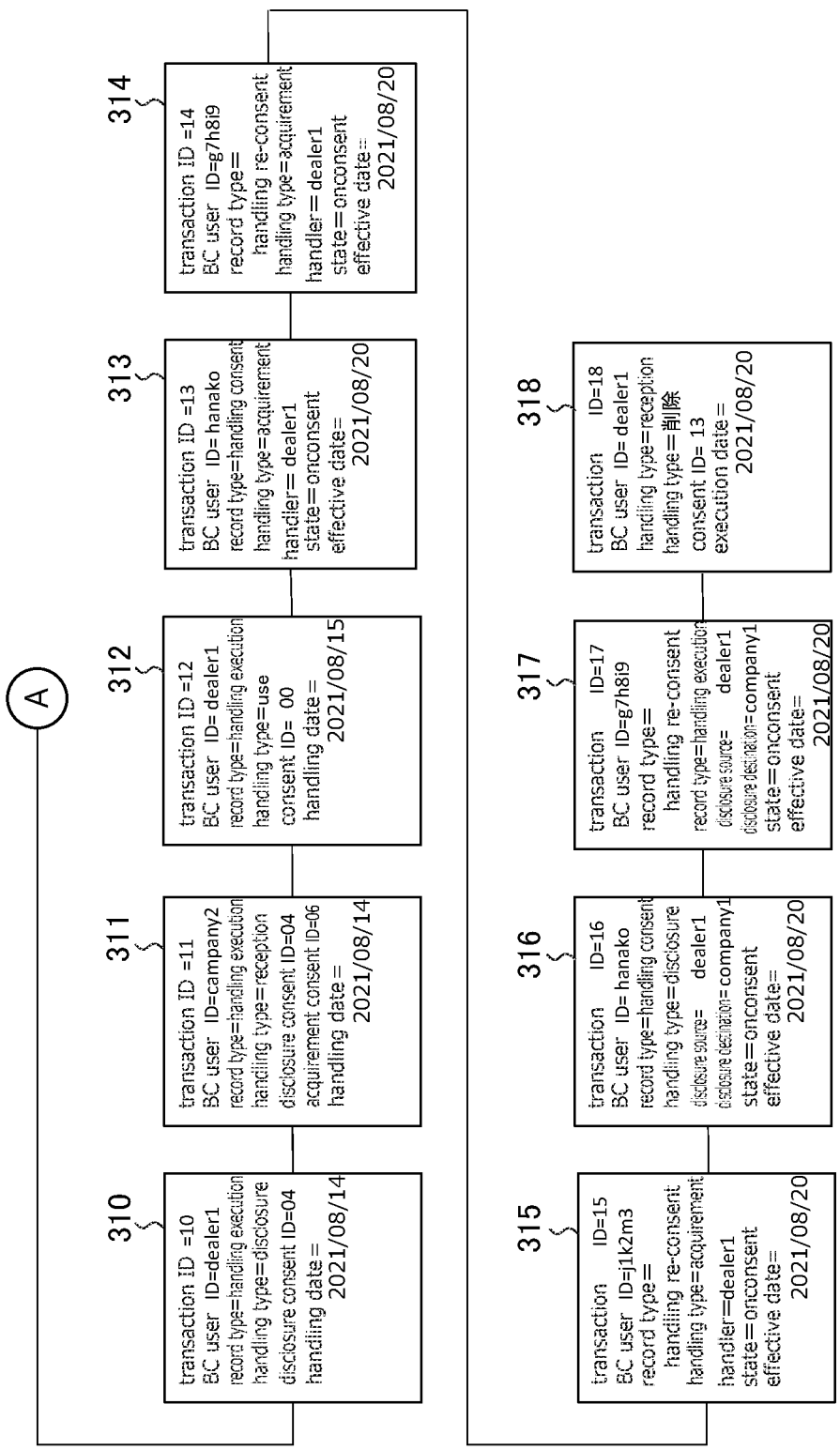
FIG. 26 is a diagram subsequent to FIG. 25.

FIG. 25 shows an example of the blockchain according to this embodiment, FIG. 26 is a diagram subsequent to FIG. 25. Hereinafter, the blockchain in FIGS. 25 and 26 is described.

FIGS. 25 and 26 show the blockchain that includes blocks 300 to 318. Records related to data, more specifically, records related to data handling are written in the blockchain. Transaction IDs indicated in the blocks 300 to 318 are identifiers of processes (transactions) indicated by the respective records. BC user IDs indicated in the blocks 300 to 318 mean user IDs in the blockchain, and indicate the subjects of processes indicated by the respective records.

For the third embodiment, the relationship with terms used in the descriptions of the first and second embodiments is described.

The data related party in the third embodiment corresponds to the data owner in the first and second embodiments.

The transaction ID corresponds to the consent information identifier or the record identifier in the first and second embodiments.

The BC user ID corresponds to the owner identifier or the record business operator in the first and second embodiments.

The "handling" is used as what has meaning similar to that of "process" in the first and second embodiments.

The records related to the process include use records, besides disclosure records, receipt records, acquirement records, generation records, and deletion records. Note that there is no example of generation records in the third embodiment.

The records related to the consent (consent information) include records of consent to direct acquirement, records of consent to indirect acquirement, and records of consent to disclosure. While there is no example of consent to indirect acquirement in the embodiment 3, consent to disclosure whose disclosure destination is the data handler corresponds to consent to indirect acquirement.

The block 300 indicates a record (handling consent record) indicating that the data related party having the BC user ID of "hanako" consents to handling of data acquirement by the data handler having the BC user ID of "dealer1". The effective date of consent is on and after Aug. 11, 2021. The handling type "acquirement" and the record type is "handling consent". Such a record related to the consent is called consent to direct acquirement. The state is "consent". While "hanako" may be the real name or a pseudonym, a case of a pseudonym is assumed in this embodiment.

The data acquirement in this embodiment may include holding of acquired data. That is, consent to acquirement of data means consent also to holding of the acquired data. Note that the data acquirement, and holding of the acquired data may be separately defined as different handling types.

The block 301 also indicates a handling consent record. The block 301 indicates that "hanako" has consented to disclosure of providing data when the data disclosure source is "dealer1" and the data disclosure destination is a data user having the BC user ID of "company1". This can be regarded also as consent to data reception by "company1". In this record, the handling type is "disclosure" and the record type is "handling consent", Such a record related to the consent is called consent to disclosure. Likewise, the block 302 indicates that "hanako" has consented to disclosing data when the data disclosure source is "dealer1" and the data user is "company2". This can be regarded also as consent to data reception by "company2". Similar to the block 301, the handling type is "disclosure" and the record type is "handling consent" (consent to disclosure).

The blocks 303 and 304 indicate the same records (handling consent record) as the blocks 301 and 302 except that the BC user IDs are different. The BC user IDs indicated by the blocks 303 and 304 are changed in accordance with the user (disclosure destination). In other words, the BC user ID is an identifier dedicated for each user. The BC user ID is an identifier uniquely corresponding to a combination of a related party and a user. The data related party "hanako" is represented by an identifier that is different among users. Even with the same user, the identifier is different in accordance with the related party to be combined. A handling consent record whose BC user ID is replaced with the identifier for a user corresponding to the related party is called a handling re-consent record. Accordingly, in each of the blocks 303 and 304, the record type is "handling re-consent".

The blocks 305 and 306 indicate the same handling consent records as the block 300 except that the BC user IDs are different. Similar to the blocks 303 and 304, BC user IDs indicated in the blocks 305 and 306 are identifiers uniquely corresponding to combinations of related parties and users.

The block 307 is a handling execution record related to data acquirement. The subject of acquirement is "dealer1", and it is indicated that data acquirement was performed on Aug. 13, 2021. The record type is "handling execution" and the handling type is "acquirement". Handling execution records with the handling type of "acquirement" are sometimes called handling execution records related to acquirement, handling execution records of acquirement, or acquirement records or the like.

The block 308 is a handling execution record related to data disclosure by "dealer1". The handling type is "handling execution" and the record type is "disclosure". Handling execution records with the handling type of "disclosure" are sometimes called handling execution records related to disclosure, handling execution records of disclosure, or disclosure records or the like.

The block 309 is a use record related to data receipt by "campany1" corresponding to the data disclosure by "dealer1". The disclosure source of the data can be identified from the disclosure source "dealer1" with the disclosure consent ID "03" to be referred to. The record type is "handling execution" and the handling type is "receipt". Handling execution records with the handling type of "receipt" are sometimes called handling execution records related to receipt, handling execution records of receipt, or receipt records or the like.

Likewise, the block 310 is a handling execution record related to data disclosure by "dealer1" (disclosure record).

The block 311 is a use record (receipt record) related to data receipt by "campany2" corresponding to the data disclosure by "dealer1". The blocks 310 and 311 have content similar to that of the blocks 308 and 309. However, the disclosure consent IDs and the acquirement consent IDs are different from those of the blocks 308 and 311.

The block 312 is a handling execution record representing data use by "dealer1". The record type is "handling execution" and the handling type is "use". Such a record related to handling is called a use record. The related party of the data has the BC user ID "hanako" with the consent ID "00" to be referred to. While "dealer1" corresponds to the data handler (see FIG. 1), data use can be performed not only by the data user but also by the data handler. That is, the data handler can be a data user.

The block 313 indicates a record (handling consent record) indicating that the data related party having the BC user ID of "hanako" has withdrawn consent to acquirement of data by the data handler of "dealer1". In the block 313, the state is "nonconsent".

The blocks 314 and 315 indicate the same handling consent records as the block 313 except that the BC user IDs are different. The BC user IDs indicated in the blocks 314 and 315 are changed in accordance with the user, in other words, identifiers uniquely corresponding to the respective users. In the blocks 314 and 315, the record type is "handling re-consent" and the state is "nonconsent".

The block 316 indicates a record (handling consent record) indicating that the data related party having the BC user ID of "hanako" has withdrawn consent to handling that is disclosure of data from "dealer1" to "company1".

The block 317 indicates the same handling consent records as the block 316 except that the BC user IDs are different. The BC user ID indicated in the block 317 is changed in accordance with the user, and is an identifier uniquely corresponding to the user. In the block 317, the record type is "handling re-consent" and the state is "nonconsent".

The block 318 is a handling execution record (deletion record) representing data deletion by "dealer1". The related party of the data is "hanako" indicated by the BC user ID of the block 313 with the consent ID (transaction ID) "13" to be referred to.

Note that the record to be written in the blockchain can include various pieces of information. For example, the handling consent record related to handling (e.g., the block 300) may include the source from which the handler acquires data, in other words, the data transmission source. The handling execution record related to handling (e.g., the block 307) may include the source from which the handler has acquired data, in other words, the data transmission source. For example, the handling consent record related to disclosure (e.g., the block 308) may include allowance of disclosure of the entire data, or data items indicating what part of data is allowed to be disclosed. The handling consent record and the handling execution record may explicitly include the data disclosure destination. Alternatively, in the case where the data disclosure destination can be identified by referring to another record as described above, the data disclosure destination may be omitted.

In the example in FIGS. 25 and 26, one record is written in one block. However, one-to-one correspondence is not necessary. Multiple records may be written in one block. For example, the handling consent record related to acquirement (consent to direct acquirement), and the handling consent record related to disclosure (consent to disclosure) may be written in one block. Multiple items of the same type may be written in one record. For example, multiple types of consent, such as the consent to acquirement (consent to direct acquirement), and the consent with respect to disclosure (consent to disclosure), may be included in one handling consent record. Alternatively, one handling consent record related to acquirement (consent to direct acquirement) may include consent on pieces of acquirement by the respective related parties. When multiple data items are disclosed at one time based on the pieces of consent, the handling execution record related to data disclosure (disclosure record) may include information indicated by multiple handling consent records related to data disclosure (consent to disclosure).

Only if required information can be read from blocks, records may be written in the blocks in any manner. For example, part of or the entire record may be included as meta-information in a block.

By writing a record in the blockchain as described above, traceability can be secured. Note that the blocks of the blockchain can be used by information processing apparatuses only if the apparatuses belong to the blockchain system (P2P network). Accordingly, confidentiality should be discussed; in the blockchain in FIGS. 25 and 26, measures for confidentiality are also taken. For example, in FIGS. 25 and 26, the BC user ID is indicated by the identifier (pseudonym) that is "hanako". Provided that the identifier is not related to an actual personal name, it is difficult to identify the person. By performing a method of achieving a pseudonym through replacement of the personal name with another character string or numerals according to a predetermined rule, identification of the person can be difficult.

Note that the record to be written in the blockchain may be assigned various pieces of information. For example, details of data to be acquired or disclosed may be assigned. When part of data passed from the related party apparatus 501 is provided by the data management apparatus 101 for the user apparatus 701, information allowing this part to be identified, for example, information on the name of the item or on the position in the data, may be recorded. If the number of data management apparatuses 101 is one, the BC user ID of 101 as the disclosure source is not the data management apparatus necessarily included in the record.

After the writing of the record to the blockchain is performed as described above, consent to disclosure to a third party and the history of disclosure can be verified by comparing data while reducing the disadvantage of leakage of information identifying the data related party, even in case of data leakage.

For example, the data related party can verify whether the content of consent is as intended by the data related party or not by reading the handling consent record written in the block of the blockchain using, as a key, the BC user ID of the normal identifier. In the example in FIG. 26, the related party apparatus 501 can detect the blocks 300, 301, 302 and 313 using "hanako" as a key. Accordingly, it can be verified whether the consent to acquirement (consent to holding), consent to disclosure to a first user that is "company1", and consent to disclosure to a second user that is "company2" are effective or not.

The first user cannot recognize that the identifier "j1k2m3" for the second user represents the data related party identical to that of the identifier "g7h8i9" for the first user. Likewise, the second user cannot recognize that the identifier "g7h8i9" for the first user represents the data related party identical to that of the identifier "j1k2m3" for the second user. Accordingly, in case one of the first user and the second user leaks data, the other cannot identify that the data is that of "hanako" by comparison. Consequently, disadvantages due to data leakage can be reduced.

Note that in a case where the data related party knows the identifier for the data user, and the traceability can be secured even by the identifier for the data user, generation of the blocks 301 and 302 may be omitted, according to certain specifications of the system. In the case where generation of the blocks 301 and 302 is omitted, a query may be issued to the information processing apparatus that recognizes the correspondence between the normal identifier and the unique identifier for each user. Accordingly, the normal identifier of the data related party having consented to data disclosure or data acquisition, or the identifier for the user can be verified.

Note that after the related party apparatus 501 consents to data disclosure, this apparatus may withdraw the consent to disclosure. Accordingly, it is preferable to be capable of verifying that consent to disclosure is not withdrawn before data is disclosed. That is, when the related party apparatus 501 withdraws consent to data disclosure, a record of withdrawing the consent to disclosure is written in the blockchain. Preferably, before data is provided, the data management apparatus 101 searches the blockchain using, as a key, the BC user ID of the related party apparatus 501 and determines whether the consent to disclosure is withdrawn or not. Note that in a case where an expiration date is indicated in the consent to disclosure, it is preferable to verify whether the expiration date indicated in the consent to disclosure is expired or not. As described above, it is preferable to verify the effectiveness of the consent to disclosure before data disclosure.

Note that only "dealer1" is described above as the data handler. Alternatively, a case where multiple handlers exist may be adopted. In such a case, for each of the data handlers, the BC user ID of the data related party may be changed. For each combination of the data handler and the data user, the BC user ID of the data related party may be changed. For example, "g7h8i9" is used for the handling consent record of data disclosure from the data handler of "dealer1" to the data user "company1". An identifier other than "g7h8i9" is used for the handling consent record of data disclosure from another data handler of "dealer2" to the data user "company1". Accordingly, disadvantages due to data leakage can be reduced.

Note that the blockchain in FIGS. 25 and 26 is only an example. Various records may be written in the blockchain. For example, a use record other than data receipt, such as a record indicating that the data user has executed data analysis, editing or deletion, may be written. The items of received data, the BC user ID of the data management apparatus 101 that has disclosed the data may be recorded in the use record related to receipt.

The verification apparatus 1 accesses the association table 91, and verifies the consistency between the record related to the process and the data access log with respect to each data related party.

Figure 27:
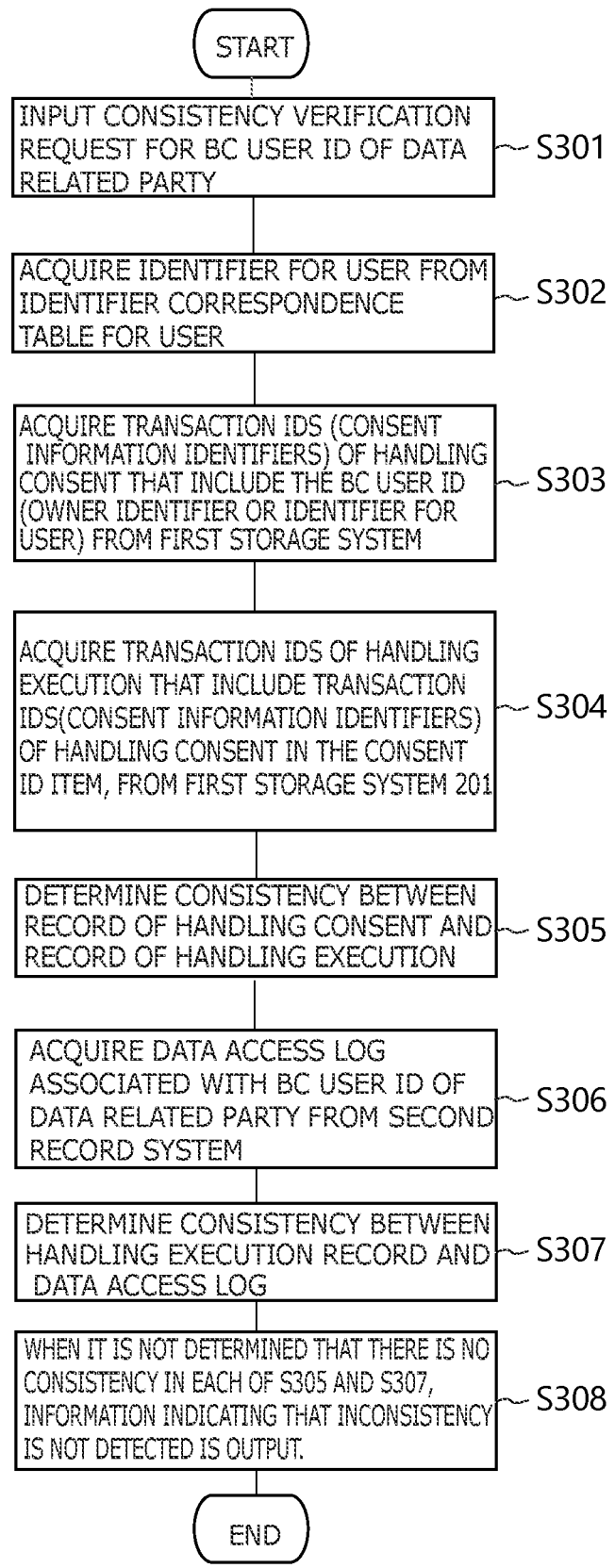
FIG. 27 is a flowchart of an example of operations of a verification apparatus according to the third embodiment.

FIG. 27 is a flowchart of an example of operations of the verification apparatus 1 according to the third embodiment.

Step S301: the verification apparatus 1 receives a consistency verification request for the BC user ID (e.g., the owner identifier) of the data related party.

Step S302: the verification apparatus 1 acquires the BC user ID that is the identifier for the user, from the association table 91, based on the BC user ID (owner identifier) of the data related party.

Step S303: the verification apparatus 1 acquires the transaction IDs (consent information identifiers) of handling consent that include the BC user ID (the owner identifier or the identifier for the user) from the first storage system 201.

Step S304: the verification apparatus 1 acquires the transaction IDs of handling execution that include transaction IDs (consent information identifiers) of handling consent in the consent ID item, from the first storage system 201. In a case where the BC user ID (the identifier for the user) of the data related party is included in the handling execution record (the record related to the process), the transaction ID of the handling execution including the BC user ID of the data related party (the owner identifier or the identifier for the user) may be acquired from the first storage system 201.

Step S305: the verification apparatus 1 verifies the consistency between the handling consent (record related to the consent) and the handling execution record (record related to the process).

Step S306: the verification apparatus 1 acquires a data access log (see FIG. 28 shown later) associated with the BC user ID of the data related party (data owner or the like), from the second storage system 601. In the data access log, the BC user ID for the target record business operator is used as the BC user ID of the data related party (even with the same data related party, the BC user ID is different with respect to each record business operator).

Step S307: the verification apparatus 1 verifies consistency between the handling execution record (record related to the process) including the BC user ID of the target record business operator among the handling execution records indicated by the transaction ID acquired in step S304, and the data access log.

In the record-originated verification, processes similar to those in the embodiment 1-1 are performed. It is determined that there is no consistency when the handling execution record is a use record and the corresponding reading log does not exist with respect to the use record.

When the verification apparatus 1 determines that there is no consistency with respect to at least one of the record origination and the log origination, this apparatus detects inconsistency (determines that there is no consistency).

Step S308: when inconsistency is detected neither in step S305 nor S307, the verification apparatus 1 determines that inconsistency is not detected as a whole. The verification apparatus 1 may output information indicating that inconsistency is not detected as a whole (for example, display it on screen). When it is determined that there is no consistency in at least one of steps S305 and S307, it is determined that inconsistency is detected as a whole. The verification apparatus 1 may output information indicating that inconsistency is detected as a whole. In this case, information for identifying which of steps S305 and S307 has detected inconsistency may be displayed on screen together.

Hereinafter, an example of the operation of each step is specifically described.

Example 1

Step S301: the verification apparatus 1 receives a consistency verification request for the BC user ID ("hanako").

Step S302: the verification apparatus 1 acquires the BC user ID ("g7h8i9") that is the identifier for the first user corresponding to the BC user ID ("hanako"), and the BC user ID ("j1k2m3") that is the identifier for the second user, from the association table 91.

Step S303: the verification apparatus 1 acquires the transaction IDs "00", "01", "02", "03", "04", "05", "06", "13", "14", "15", "16" and "17" of the handling consent including the BC user IDs ("hanako", "g7h8i9" and "j1k2m3"), from the first storage system 201.

Step S304: the verification apparatus 1 acquires the transaction IDs "07", "08", "09", "10", "11", "12" and "18" of handling execution that include transaction IDs "00", "01", "02", "03", "04", "05", "06", "13", "14", "15", "16" and "17" of handling consent in the consent ID, from the first storage system 201.

Step S304: the verification apparatus 1 verifies the consistency between the handling consent (record related to the consent) and the handling execution record (record related to the process). It is determined that inconsistency is not detected.

S306: the verification apparatus 1 acquires Step the data access log associated with the BC user ID ("hanako") from the second storage system 601.

FIG. 28 shows an example of a data access log 3-1. Logs on the first to fifth rows of the data access log in FIG. 28 are acquired. The BC user ID of the target record business operator is assumed as "dealer1". Based on "dealer1", transaction IDs "07", "08", "10", "12" and "18" of handling execution are acquired.

Step S307: the verification apparatus 1 verifies the consistency between the record related to the handling execution and the data access log. In the record-originated verification, the log on the first row of the data access log corresponds to the acquirement record with the transaction ID "07", the log on the second row of the data access log corresponds to the disclosure record with the transaction ID "08", the log on the third row of the data access log corresponds to the disclosure record with the transaction ID "10", the log on the fourth row of the data access log corresponds to the use record with the transaction ID "12", and the log on the fifth row of the data access log corresponds to the deletion record with the transaction ID "18". In the record-originated verification, inconsistency is not detected.

In the log-originated verification, it is determined that the acquirement record with the transaction ID "07" corresponds to the first row of the data access log, and the deletion record with the transaction ID "18" corresponds to the fifth row of the data access log. In the log-originated verification, inconsistency is not detected.

Consequently, the verification apparatus 1 determines that inconsistency between the handling execution record (record related to the process) and the data access log is not detected.

Step S308: the description is omitted because this step is similar to step S107 in the embodiment 1-1.

Embodiment 3-2

The verification apparatus 1 accesses the association table 91, and verifies the consistency between the handling execution record (record related to the process) and the communication log with respect to each data related party. As for the operations of the verification apparatus in the embodiment 3-2, steps S301 to S305 and S308 in the embodiment 3-1 similarly apply to the embodiment 3-2. Operations corresponding to steps S306 and S307 are different from those in the embodiment 3-1.

Step S306: the verification apparatus 1 acquires the communication log associated with the BC user ID of the data related party from the second storage system 601.

Step S307: the verification apparatus 1 verifies consistency between the handling execution record (record related to the process) including the BC user ID of the target record business operator among the handling execution records indicated by the transaction ID acquired in step S304, and the communication log. When it is determined that there is no consistency with respect to at least one of the record origination and the log origination, inconsistency is detected (it is determined that there is no consistency).

Hereinafter, an example of the operation of each step is specifically described.

Steps S301 and S302: the description is omitted because these steps are similar to those in the embodiment 3-1.

Steps S303 to S305: the description is omitted because these steps are similar to those in the embodiment 3-1.

Step S306: the verification apparatus 1 acquires the communication log associated with the BC user ID ("hanako", "g7h8i9" and "j1k2m3") from the second storage system 601.

FIG. 29 shows an example of a communication log 3-2. It is assumed that only communication logs of personal data transmission and reception are acquired. The fourth to sixth rows of the communication log in FIG. 29 are acquired. The BC user ID of the target record business operator is assumed as "dealer1". Based on "dealer1", transaction IDs "07", "08", "10", "12" and "18" of handling execution are acquired.

Step S307: the verification apparatus 1 verifies the consistency between the record of handling execution and the communication log. In the record-originated verification, the fourth row of the communication log corresponds to the transaction ID "07" (acquirement record), the fifth row of the communication log corresponds to the transaction ID "08" (disclosure record), and the sixth row of the communication log corresponds to the transaction ID "10" (disclosure record). In the record-originated verification, inconsistency is not detected.

In the log-originated verification, the fifth row of the communication log corresponds to the transaction ID "08" (disclosure record), and the sixth row of the communication log corresponds to the transaction ID "10" (disclosure record). In the log-originated verification, inconsistency is not detected. Note that in this example, the transaction ID "07" (acquirement record) is present so as to correspond to the fourth row of the communication log. In some cases, the transaction ID "07" (acquirement record) is not present so as to correspond to the fourth row of the communication log. For example, in receipt or acquirement of personal data, the personal data is received via the communication network, consent to indirect acquirement or consent to direct acquirement is then verified, and when any record related to the consent does not exist or the consent state is nonconsent, operations without writing the personal data in the data holding device 11 are permitted. Accordingly, non-existence of the acquirement record corresponding to data reception does not necessarily indicate inconsistency. Consequently, in the log-originated verification, verification of whether the transaction ID "07" (acquirement record) corresponding to the fourth row of the communication log exists is not necessarily required. In this operation example, such verification is not performed.

Consequently, the verification apparatus 1 determines that inconsistency between the handling execution record (record related to the process) and the communication log is not detected.

Step S308: the description is omitted because this step is similar to that in the embodiment 1-1.

Embodiment 3-3

The verification apparatus 1 accesses the association table 91, and verifies the consistency between the record related to the consent and the communication log with respect to each data related party. As for the operations of the verification apparatus in the embodiment 3-3, steps S301 to S305 and S308 in the embodiment 3-1 similarly apply to the embodiment 3-3. Operations corresponding to steps S306 and S307 are different from those in the embodiment 3-1.

Step S306: the verification apparatus 1 acquires the communication log associated with the BC user ID of the data related party from the second storage system 601. In the reception log of consent of the data related party, the BC user ID for the target process business operator is used.

Step S307: the verification apparatus 1 verifies consistency between the handling consent (record related to consent) including the BC user ID of the target process business operator among pieces of handling consent indicated by the transaction ID acquired in step S304, and the communication log. When there is no consistency with respect to at least one of the record origination and the log origination, inconsistency is detected (without consistency).

Hereinafter, an example of the operation of each step is specifically described. It is assumed that the apparatus of the data related party (related party apparatus) does not directly access the first storage system 201, but accesses the first storage system 201 via the target process business operator (e.g., the data management apparatus 101 of the data handling business operator). Consequently, the communication log corresponding to the record related to the consent is held by the apparatus of the process business operator (e.g., the data management apparatus 101), and reception party that receives consent by the owner is the apparatus of the process business operator (e.g., the data management apparatus 101).

Steps S301 and S302: the description is omitted because these steps are similar to those in the embodiment 3-1.

Steps S303 to S305: the description is omitted because these steps are similar to those in the embodiment 3-1.

Step S306: the verification apparatus 1 acquires the communication log associated with the BC user ID ("hanako") from the second storage system 601. It is assumed that only communication logs of reception of consent by the data related party are acquired. The first to third and seventh rows of the communication log in FIG. 29 are acquired. The BC user ID of the target process business operator is assumed as "dealer1". Based on "dealer1", transaction IDs "00", "01", "02", "13" and "16" of handling consent are acquired.

Step S307: the verification apparatus 1 verifies the consistency between the record of the handling consent (consent information) and the communication log. In the record-originated verification, the first row of the communication log corresponds to the consent to direct acquirement with the transaction ID "00", the second row of the communication log corresponds to the consent to disclosure with the transaction ID "01", the third row of the communication log corresponds to the consent to disclosure with the transaction ID "02", and the seventh row of the communication log corresponds to the withdrawal of consent to direct acquirement with the transaction ID "13", Withdrawal of consent to disclosure with the transaction ID "16" is generated as an internal process based on withdrawal of consent to direct acquirement with the transaction ID "13". Accordingly, there is no corresponding communication log. In the record-originated verification, inconsistency is not detected.

In the log-originated verification, the first row of the communication log corresponds to the consent to direct acquirement with the transaction ID "00", the second row of the communication log corresponds to the consent to disclosure with the transaction ID "01", the third row of the communication log corresponds to the consent to disclosure with the transaction ID "02", and the seventh row of the communication log corresponds to the withdrawal of consent to direct acquirement with the transaction ID "13". In the log-originated verification, inconsistency is not detected.

Consequently, the verification apparatus 1 determines that inconsistency between the record related to the consent and the communication log is not detected.

Step S308: the description is omitted because this step is similar to that in the embodiment 1-1.

Embodiment 3-4

The verification apparatus 1 accesses the association table 91, and verifies the consistency between the record related to the consent and the authentication log with respect to each data related party. As for the operations of the verification apparatus in the embodiment 3-4, steps S301 to S305 and S308 in the embodiment 3-1 similarly apply to the embodiment 3-4. Operations corresponding to steps S306 and S307 are different from those in the embodiment 3-1.

Step S306: the verification apparatus 1 acquires the authentication log associated with the BC user ID of the data related party from the second storage system 601. In the authentication log of the data related party, the BC user ID of the target process business operator is used as the BC user ID of the data related party.

Step S307: the verification apparatus 1 verifies consistency between the handling consent (record related to the consent) including the BC user ID of the target process business operator among pieces of handling consent indicated by the transaction ID acquired in step S304, and the authentication log.

Hereinafter, an example of the operation of each step is specifically described. It is assumed that the apparatus of the data related party (related party apparatus) does not directly access the first storage system 201, but accesses the first storage system 201 via the apparatus of the target process business operator (e.g., the data management apparatus 101). Consequently, the authentication log corresponding to handling consent (record related to the consent) is held in the apparatus of the process business operator (e.g., the data management apparatus 101).

Steps S301 and S302: the description is omitted because these steps are similar to those in the embodiment 3-1.

Steps S303 to S305: the description is omitted because these steps are similar to those in the embodiment 3-1.

Step S306: the verification apparatus 1 acquires the authentication log associated with the BC user ID ("hanako") from the second storage system 601.

FIG. 30 shows an example of an authentication log 3-4. It is assumed that only authentication logs of the data related party are acquired. The first to fourth rows of the authentication log in FIG. 30 are acquired.

The BC user ID of the target process business operator ("dealer1") is assumed. Based on "dealer1", transaction IDs "00", "01", "02", "13" and "16" of handling consent are acquired.

Step S307: the verification apparatus 1 verifies the consistency between the record of the handling consent (consent information) and the authentication log. In the record-originated verification, the first row of the authentication log corresponds to the consent to direct acquirement with the transaction ID "00", the second row of the authentication log corresponds to the consent to disclosure with the transaction ID "01", the third row of the authentication log corresponds to the consent to disclosure with the transaction ID "02", and the fourth row of the authentication log corresponds to the withdrawal of consent to direct acquirement with the transaction ID "13". Withdrawal of consent to disclosure with the transaction ID "16" is generated as an internal process based on withdrawal of consent to direct acquirement with the transaction ID "13". Accordingly, there is no corresponding authentication log. In the record-originated verification, inconsistency is not detected.

Consequently, the verification apparatus 1 determines that inconsistency between the handling consent (record related to consent) and the authentication log is not detected.

Step S308: the description is omitted because this step is similar to that in the embodiment 1-1.

(Hardware Configuration)

Figure 31:
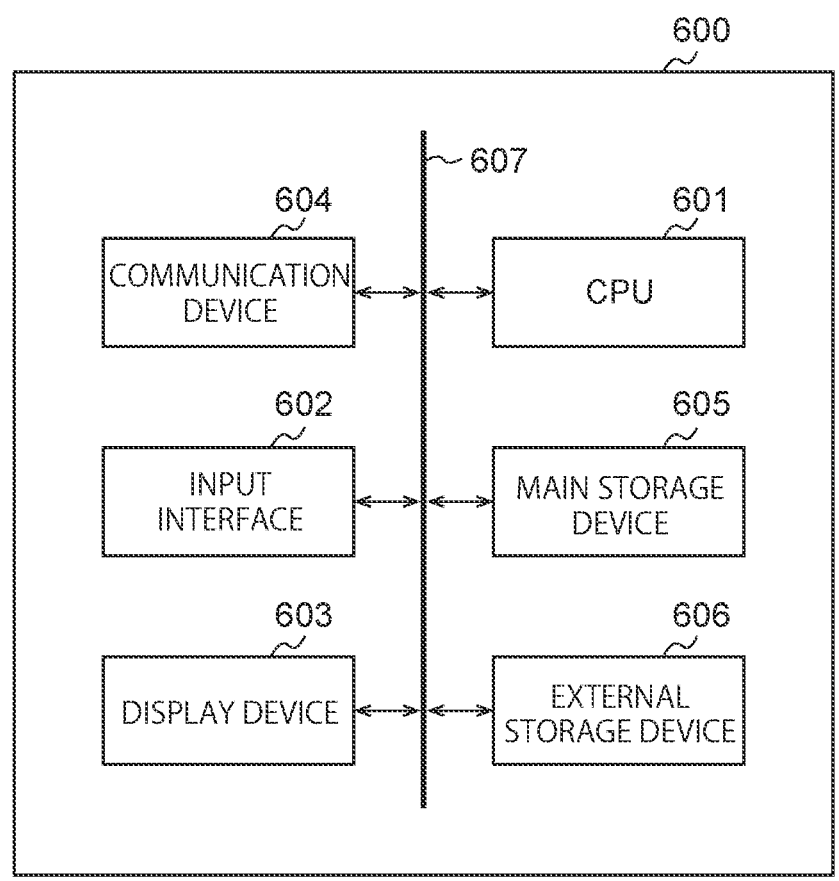
FIG. 31 shows a hardware configuration of a verification apparatus (information processing apparatus).

FIG. 31 illustrates a hardware configuration of the verification apparatus 1 (information processing apparatus) according to the present embodiment. The DATA MANAGEMENT APPARATUS 101, DATA TRANSMITTER APPARATUS 301, DATA RECEIVER APPARATUS 401 and OWNER APPARATUS 501 also have the similar hardware configuration. The verification apparatus 1 is constructed of a computer apparatus 900. The computer apparatus 900 is provided with a CPU 901, an input interface 902, a display device 903, a communication device 904, a main storage 905 and an external storage device 906, which are mutually connected by a bus 907.

The CPU (central processing unit) 901 executes a computer program for implementing the above-mentioned respective functional components of the information processing apparatus 101 on the main storage 905. The CPU 901 executes the computer program and thereby implements the respective functional components.

The input interface 902 is a circuit for inputting operation signals from the input device such as a keyboard, mouse, and touch panel or the like into the verification apparatus 1.

The display device 903 displays data or information outputted from the data management apparatus 101. The display device 903 is, for example, an LCD (Liquid Crystal Display), a CRT (Cathode Ray Tube), and a PDP (plasma display), but the display device 903 is not limited thereto. The data or information outputted from computer apparatus 900 can be displayed by this display device 903.

The communication device 904 is a circuit for the information processing apparatus 101 to communicate with the external device by wireless or wired means. Information can be inputted from the external device via the communication device 904. The information inputted from the external device can be stored in the DB, the main storage 905, or the external storage device 906.

The main storage 905 stores a program that implements processing of the present embodiment, data necessary to execute the program and data generated by executing the program. The program is developed and executed on the main storage 905. The main storage 905 may be, for example, RAM, DRAM or SRAM, but it is not limited to this. The various DBs and the storage in each embodiment may be constructed on the main storage 905. The storage or the DB of the verification apparatus 1 may be constructed on the main storage 905.

The external storage device 906 stores the above-described program and data necessary to execute the program, data generated by executing the program or the like. The program and data are read into the main storage 905 during processing of the present embodiment. The external storage device 906 is, for example, a hard disk, an optical disk, a flash memory or a magnetic tape, but it is not limited to this.

The various DBs and the storage in each embodiment may be constructed on the external storage device 906.

Note that the above-described program may be pre-installed in the computer apparatus 900 or may be stored in a storage medium such as a CD-ROM. The program may be uploaded on the Internet.

In addition, the data management device 101 may be constructed of the single computer apparatus 900 or may be configured as a system composed of a plurality of mutually connected computer apparatuses 900.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus, comprising:
a processor configured to:
acquire a record that is at least one of a record related to a process for data and a record related to a consent to the process for the data, from a first storage system that stores the record;
acquire a log of an operation performed in relation to at least one of the process and the consent, from a second storage system that stores the log; and
verify consistency of the acquired record, based on the acquired log; and
an input device that receives a verification request for consistency, the verification request including a condition regarding a verification target in terms of the data,
wherein the processor acquires the record satisfying the condition from the first storage system, and acquires the log satisfying the condition from the second storage system.

2. The information processing apparatus according to claim 1,
wherein when the log of the operation corresponding to the process is not included in the acquired log or when the acquired record indicates the consent and the consent indicated by the acquired record is not included in the acquired log, the processor determines that there is no consistency.

3. The information processing apparatus according to claim 1, when a record related to the process corresponding to the operation indicated by the acquired log is not included in the acquired record or a record related to the consent corresponding to the operation indicated by the acquired log is not included in the acquired record, the processor determines that there is no consistency.

4. The information processing apparatus according to claim 1,
wherein when a plurality of operations are performed in relation to the process, a plurality of logs corresponding to the operations are stored in the second storage system, and
the processor acquires the plurality of logs corresponding to the operations from the second storage system, identifies the log corresponding to the operation performed last among the acquired logs, and determines that there is no consistency when a record related to the process corresponding to the operation indicated by the identified log is not included in the acquired record.

5. The information processing apparatus according to claim 1,
wherein the processor acquires information on a correspondence between a first identifier included in the record stored in the first storage system, and a second identifier included in the log held in the second storage system, from a data management apparatus that stores the information on the correspondence, and
the processor verifies the consistency, based further on the correspondence indicated by the information.

6. The information processing apparatus according to claim 5,
wherein the processor detects the second identifier corresponding to the first identifier included in the acquired record, from the correspondence, and determines that there is no consistency when a value calculated based on the detected second identifier and on the first identifier included in the acquired record is different from a value included in an item of the acquired record.

7. The information processing apparatus according to claim 1,
wherein the processor acquires the data that is a target of the process in the record, from a data management apparatus that stores the data, and
when a value included in an item of the acquired record is different from a value calculated from the acquired data, the processor determines that there is no consistency.

8. The information processing apparatus according to claim 1,
wherein when a value included in the record related to the consent is different from a value calculated from a consent document designated by an item of the record related to the consent, the processor determines that there is no consistency.

9. The information processing apparatus according to claim 1,
wherein the processor acquires the record related to the process, and the record related to the consent to the process, and
determines that there is no consistency, when the record related to the consent to the process does not exist, or when a time of the process indicated by the record related to the process is not included in a consent time period identified based on the record related to the consent to the process.

10. The information processing apparatus according to claim 1,
wherein the record related to the process is at least one of a receipt record, a disclosure record, an acquirement record, a generation record, a deletion record, and a use record, and
the processor
determines that there is no consistency, when a log of writing data corresponding to the receipt record is not included in the acquired log,
determines that there is no consistency, when a log of reading data corresponding to the disclosure record is not included in the acquired log,
determines that there is no consistency, when a log of writing data corresponding to the acquirement record is not included in the acquired log,
determines that there is no consistency, when a log of reading or a log of writing data corresponding to the generation record is not included in the acquired log,
determines that there is no consistency, when a log of deleting data corresponding to the deletion record is not included in the acquired log, and
determines that there is no consistency, when a log of reading data corresponding to the use record is not included in the acquired log.

11. The information processing apparatus according to claim 1,
wherein the processor
determines that there is no consistency, when an acquirement record, a receipt record or a generation record corresponding to a log of writing data is not included in the acquired record, and
determines that there is no consistency, when a deletion record corresponding to a log of deleting data is not included in the acquired record.

12. The information processing apparatus according to claim 1,
wherein the record related to the process is at least one of a receipt record, a disclosure record, and an acquirement record, and
the processor
determines that there is no consistency, when a log of receiving data corresponding to the receipt record is not included in the acquired log,
determines that there is no consistency, when a log of transmitting data corresponding to the disclosure record is not included in the acquired log, and
determines that there is no consistency, when a log of receiving data corresponding to the acquirement record is not included in the acquired log.

13. The information processing apparatus according to claim 1,
wherein the processor determines that there is no consistency, when a disclosure record corresponding to a log of transmitting data is not included in the acquired record.

14. The information processing apparatus according to claim 1,
wherein the record related to the consent includes at least one of a record of consent to holding and a record of consent to disclosure, and
the processor
determines that there is no consistency, when a log of receiving consent corresponding to the consent to holding is not included in the acquired log, and
determines that there is no consistency, when a record of withdrawing the consent to holding is not included in the acquired record, and a log of receiving consent corresponding to the consent to disclosure is not included in the acquired log.

15. The information processing apparatus according to claim 1,
wherein the processor determines that there is no consistency, when at least one of records of consent to indirect acquirement, consent to direct acquirement, and consent to disclosure that correspond to a log of receiving consent is not included in the acquired record.

16. The information processing apparatus according to claim 1,
wherein the log stored in the second storage system includes a result of an authentication process for a related party performed by an apparatus that accepts the consent to the process by a related party of the data, performs the authentication process for the related party, and provides the first storage system with the record related to the consent when the authentication process succeeds, the record related to the consent includes at least one of a record of consent to holding and a record of consent to disclosure, and the processor determines that there is no consistency, when a log of success in authentication corresponding to the record of consent to holding does not exist, and determines that there is no consistency, when a record of withdrawing the consent to holding is not included in the acquired log, and a log of success in authentication corresponding to the record of consent to disclosure does not exist.

17. The information processing apparatus according to claim 1, wherein the processor determines whether the process for the data is executable to the data, on the basis of the consent and the verification request; and performs the process on the data, according to the determination result.

18. The information processing apparatus according to claim 1, wherein the first storage system is a blockchain system.

19. An information processing method, comprising:

acquiring a record that is at least one of a record related to a process for data and a record related to consent to the process for the data, from a first storage system that stores the record;

acquiring a log of an operation performed in relation to at least one of the process and the consent, from a second storage system that stores the log;

verifying consistency of the acquired record, based on the acquired log; and receiving a verification request for consistency, the verification request including a condition regarding a verification target in terms of the data, wherein the acquiring a record includes acquiring the record satisfying the condition from the first storage system, and the acquiring a log includes acquiring the log satisfying the condition from the second storage system.

20. A non-transitory computer readable medium having a computer program stored therein which when executed by a computer, causes the computer to perform processes comprising:

acquiring a record that is at least one of a record related to a process for data and a record related to consent to the process for the data, from a first storage system that stores the record;

acquiring a log of an operation performed in relation to at least one of the process and the consent, from a second storage system that stores the log;

verifying consistency of the acquired record, based on the acquired log; and receiving a verification request for consistency, the verification request including a condition regarding a verification target in terms of the data, wherein the acquiring a record includes acquiring the record satisfying the condition from the first storage system, and the acquiring a log includes acquiring the log satisfying the condition from the second storage system.

* * * * *